US011162869B2

(12) United States Patent
Ouis

(10) Patent No.: US 11,162,869 B2
(45) Date of Patent: Nov. 2, 2021

(54) DOUBLE FORCE TWO SENSOR VIBRATION METHOD

(71) Applicant: KING FAHD UNIVERSITY OF PETROLEUM AND MINERALS, Dhahran (SA)

(72) Inventor: Djamel Ouis, Riyadh (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 281 days.

(21) Appl. No.: 16/587,150

(22) Filed: Sep. 30, 2019

(65) Prior Publication Data

US 2021/0096038 A1  Apr. 1, 2021

(51) Int. Cl.
G01M 5/00 (2006.01)
G01M 7/00 (2006.01)

(52) U.S. Cl.
CPC ........ *G01M 5/0066* (2013.01); *G01M 5/0025* (2013.01)

(58) Field of Classification Search
CPC combination set(s) only.
See application file for complete search history.

(56) References Cited

U.S. PATENT DOCUMENTS

| | | |
|---|---|---|
| 3,066,525 A | 12/1962 | Harris |
| 3,345,861 A | 10/1967 | Heath |
| 3,521,483 A | 7/1970 | Miller et al. |
| 3,531,983 A | 10/1970 | Heath |
| 3,664,180 A | 5/1972 | McDonald et al. |
| 3,877,294 A | 4/1975 | Shaw |
| 4,350,044 A | 9/1982 | Richardson et al. |

(Continued)

FOREIGN PATENT DOCUMENTS

| | | |
|---|---|---|
| EP | 0 379 622 A1 | 8/1990 |
| JP | 2005-180951 A | 7/2005 |
| WO | WO 2016/178683 A1 | 11/2016 |

OTHER PUBLICATIONS

Brian K. Brashaw, et al., "Nondestructive Testing and Evaluation of Wood: A Worldwide Research Update", Forest Products Journal, vol. 59, No. 3, Mar. 2009, pp. 7-14.

(Continued)

*Primary Examiner* — Brandi N Hopkins
(74) *Attorney, Agent, or Firm* — Oblon, McClelland, Maier & Neustadt, L.L.P.

(57) ABSTRACT

A testing apparatus, method and system for determining the ovaling mode in a cylindrical object, which may be excited through the synchronous application of two diametrically opposed identical vibrators to the outer perimeter. At least one vibration sensor transforms the vibrations to electrical voltage signals. Two vibration sensors placed at diametrically opposed locations, each halfway between the vibration inducers, may be used with a summer for adding the in phase response signals. The signal response is then converted into a digital signal and transformed into the frequency domain through a Fourier transform for determining the frequencies of the modes of interest. The resonant frequency of the ovaling mode of the element is identified and compared to that of a reference cylindrical object with comparable cross-sectional size to establish the stiffness and soundness degree of the cylindrical object. A structural integrity report including the strength and stiffness is generated.

20 Claims, 17 Drawing Sheets

(56) References Cited

U.S. PATENT DOCUMENTS

| | | | |
|---|---|---|---|
| 4,399,701 | A | 8/1983 | Dunlop |
| 4,926,691 | A | 5/1990 | Franklin et al. |
| 5,105,453 | A | 4/1992 | Hanrahan et al. |
| 5,244,814 | A | 9/1993 | Barbour et al. |
| 5,396,799 | A | 3/1995 | Ross et al. |
| 6,347,551 | B1 | 2/2002 | Turpening et al. |
| 6,779,404 | B1 | 8/2004 | Brincker et al. |
| 7,146,846 | B2 | 12/2006 | Mahaffey et al. |
| 7,971,485 | B2 | 7/2011 | Greenough et al. |
| 2005/0011263 | A1 | 1/2005 | Harris |
| 2008/0179993 | A1 | 7/2008 | Sanderson |
| 2008/0255806 | A1 | 10/2008 | Sambuelli et al. |

OTHER PUBLICATIONS

Charles R. Farrar, et al., "Vibration-based structural damage identification", Philosophical Transactions: Mathematical, Physical and Engineering Sciences, vol. 359, No. 1778, 2001, pp. 131-149.

YH. Chul, et al., "Evaluation of Wood Poles Using a Free Vibration Technique", Journal of Testing and Evaluation, vol. 27, Issue 3, May 1999, pp. 191-195 (Abstract only).

Ian A. Craighead, et al., "Monitoring wood decay in poles by the vibroacoustic response method", Proceedings of the Institution of Mechanical Engineers, Part C: Journal of Mechanical Engineering Science, vol. 215, No. 8, 2001, pp. 905-917

Djamel Ouis, "Non-Destructive Techniques for Detecting Decay in Standing Trees", Arboricultural Journal, vol. 27, 2003, pp. 159-177.

Simon N. Woods, "Acoustic Inspection of Timber", Electrical and Computer Engineering, Dec. 2006, 106 pages.

D. Ouis, "Vibrational and acoustical experiments on logs of spruce", Wood Science and Technology, vol. 33, 1999, pp. 151-184.

A. Douglas Shaw, "Sonic Vibration Technique for Rot Detection in Wood Poles", IEEE Transactions on Instrumentation and Measurement, vol. 23, Issue 3, Sep. 1974, pp. 240-244 (Abstract only).

"Piezoelectric Charge Accelerometer Types 4381 and 4381-V", Brüel & Kjaer Sound & Vibration Measurement A/5, Aug. 2018, 2 pages.

"Paperless Recorder/Data Acquisition System", Omega Engineering, Aug. 19, 2019, 6 pages.

"Hand-held Exciter—Type 5961", Product Data, Brüel & Kjaer World Headquarters, Sep. 18, 2019, 2 pages.

"33210A Function Generator 10MHz Gpiblan USB 33200A Series", Keysight Technologies 33210A—Test & Measurement (/Test-Measurement/) / Signal Generators (/Test-Measurement/Signal-Generators/) / 33210A (/Keysight-Technologies—33210A/70180255/), https://www.alliedelec.com/search/productview.aspx?SKU=70180255, Aug. 19, 2019, 5 pages.

"Type 4371 Piezoelectric Charge Accelerometer'", Brüel & Kjaer Sound & Vibration, https://www.bksv.com/en/products/transducers/vibration/Vibration-transducers/accelerometers/4371, Aug. 18, 2019, 3 pages.

"Odeon 14 Features", https://odeon.dk/whats-new-version-14/, Aug. 16, 2019, 9 pages.

DOUBLE FORCE TWO SENSOR VIBRATION METHOD

BACKGROUND

Technical Field

The present disclosure is directed to a non-destructive test to determine the strength conditions and the extent of attack of decay of a cylindrical wooden element, or strength conditions such as rigidity, density, solidity, of cylindrical elements such as building components made of concrete, wood, plastic (polymer) or steel, solid or hollow.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cylindrical structures, such as columns made of metal, cast from concrete, steel, polymer or wood are used for bearing construction loads in buildings, bridges and harbour piers. Poles made of these materials may be used for lamp posts or poles for bearing telephone and electric power cables. Additionally, trees are cylindrical wooden structures. The cylindrical structure may be solid or hollow.

Cylindrical structures are subject to stresses induced by vibrations, heavy winds, earthquakes, ground subsidence, and, in the case of wooden cylinders, rot and insect infestation. These stresses cause internal damage which affects the strength and weight bearing capacity of the cylindrical structure.

The wood industry relies on the availability of high quality wood cut from hewn trees, as lumber is sawed from logs cut from the tree trunk. Prior to felling a tree, knowledge of the structural integrity status of its trunk is beneficial in order to run a wood processing operation efficiently and effectively. Cutting down a tree which yields low quality timber wastes forest resources and also costs time and money to clear the tree from the forest.

Several methods for assessing the structural integrity of cylindrical structures have been developed and equipment has been manufactured which is dedicated to assessing the strength of wood or concrete cylinders. Some of these techniques use acoustic methods, such as vibrations, sound or ultrasound to excite the structure and monitor its response. Other techniques apply an electrical voltage between two nearby positions on the structure and then measure the electrical resistance between them. Penetrating X-rays or gamma rays may be used to create a tomogram of the interior of the element. (See A. H. Hearn, Maintenance Inspection of Wood Pole Lines, South Atlantic Wood Pole Conference, (April 1961); A. J. Cserjesi, Evaluation of the Dunlop Acoustic Scan Method of Detecting Decay Using Artificially Infected Spruce Poles, Canadian Electrical Association (Mar. 20, 1984); A. L. Shigo et al., Detection of Discoloration and Decay in Living Trees and Utility Poles, USDA Forest Service Research Paper NE 294 (1974); A. L. Shigo, "Decay, Decayed Wood, and the Shigometer," The International Research Group on Wood Preservation, Document No. IRG/WP/281 (May 1980); B. D. et al., "A Sonic Method for Detecting Decay in Wood Poles," Proceedings of the American Wood-Preservers' Association (1965); C. C. Walden et al., "Sonic Examination of Marine Piles, Report on Four Years' Commercial Experience," The Dock and Harbour Authority, vol. 46, No. XLVI(535) (May 1965); D. D. Piirto, "Critical Evaluation of the Pulsed-Current Resistance Meter for Detection of Decay in Wood," Forest Products Journal, vol. 28(1) pp 52-57 (Jan. 1978); D. J. Cown, "Comparison of the Pilodyn and Torsiometer Methods for the Rapid Assessment of Wood Density in Living Trees," Forest Research Institute, New Zealand Forest Service, Rotorua, Vol. 8, pp 384-391 (1978); J. E. Breeze et al., "Predicting by Sonic Measurements the Strength of Logs and Poles Having Internal Decay," Forest Products Journal, vol. 21, No. 5, pp 39-43 (1971); W. D. Gardner et al., "Detection of Defects in Standing Poles by X-Ray Techniques" Proceedings of the 11th annual meeting of International Research Group on Wood Preservation, Raleigh, N.C., USA, 5-9 May (May 1980); P. Hoffmeyer, "The Pilodyn Instrument as a Non-Destructive Tester of the Shock Resistance of Wood," Proceedings of the 4th International Symposium on Non-Destructive Testing of Wood, Vancouver, W. A. Pullman, pp 77-99. 1978; W. C. Shortie et al., "Patterns of Resistance to a Pulsed Electric Current in Sound and Decayed Utility Poles" Forest Products Journal, vol. 28(1) pp 48-51, 1978; D. Ouis Vibrational and Acoustical Experiments on Logs of Spruce. Wood Science and Technology Vol. 33, pp 151-184, 1999, each incorporated herein by reference in its entirety).

The above methods can only locate cavities, such as rot pockets in wooden structures, and only when the decay stage is so advanced that the structure is not usable or cannot be treated. Further, decay even at its incipient stage, has a pronounced destructive effect that cannot be detected by the naked eye or probed by optical equipment. Cavities formed within the cylindrical structure may also result in an elevated rate of moisture content, which makes some of the aforementioned methods more sensitive, and sometimes unreliable when water content affects the variables measured.

Many of the above methods require large or expensive equipment (such as X-ray or gamma ray inspection) which is not easily portable or available to many small to medium-sized forest owners and sawmill operators. A simple, subjective inspection technique, such as sounding a tree or a log with a hammer blow, or prodding it with a screwdriver may be used in lieu of more expensive equipment. Such subjective inspection techniques are subject to pronounced human error and are not very precise, often resulting in discarding wood elements with superficial signs of rot but that would still be acceptable for later processes.

A technique for measuring stiffness is a three-point flexural test in which the element is bent away from its axis until a fatigue crack is created. The length of the crack is measured with respect to load. This technique is destructive and not practical for large cylindrical elements such as logs, tree trunks and concrete supports. Furthermore, should the force in this kind of test be applied to the top of a wooden pole then the outcome would be expected to be hazardous to the technical personnel.

A review of methods and devices for wood pole testing have been published in patents U.S. Pat. No. 3,866,283 to Shaw; U.S. Pat. No. 3,664,180 to McDonald; U.S. Pat. No. 3,364,811 to Gnaedinger; U.S. Pat. No. 3,531,983 to Heath; U.S. Pat. No. 3,345,861 to Heath; U.S. Pat. No. 4,399,701 to Dunlop; U.S. Pat. No. 4,297,872 to Ikeda; U.S. Pat. No. 3,521,483 to Miller; U.S. Pat. No. 3,043,132 to Schubring; U.S. Pat. No. 4,059,988 to Shaw; U.S. Pat. No. 3,066,525 to Harris, CA1249664 to Murphy, EP0379622 to Franklin.

The above-mentioned testing techniques have the disadvantages of being unwieldy, too large, too expensive or too complicated for testing cylindrical concrete, steel or wooden structures in the field. A simple sounding test is not of sufficient precision to evaluate a cylindrical structure for rot or stress cracks.

Aspects of the present disclosure describe a portable, simple to use and inexpensive testing method for use in the inspection for rot or deterioration in logs, wood poles used for the bearing of telephone or electricity cables, and in standing trees. The test may also be applied to cylindrical construction elements made of other materials, such as concrete, polymer, composite or steel, e.g., in the form of building components, which may be solid or hollow, to determine the presence and severity of stress faults which may impact structural integrity.

SUMMARY

In an exemplary embodiment, a testing apparatus for determining the structural integrity of a cylindrical object, the cylindrical object having an outer surface, a height, H, and a diameter, D is described. The testing apparatus includes first and second vibration inducers, each attached to the outer surface of the cylindrical object at diametrically opposite positions at the same height $H_1$, a signal generator electrically connected to the first and second vibration inducers, at least one vibration sensor attached at a position halfway between the vibration inducers and at a height $H_2$, the vibration sensors configured to output voltage signals representing sensed vibrations, a signal amplifier configured to amplify the voltage signals, an A/D converter configured to digitize the voltage signals, a computer having circuitry and at least one processor including program instructions configured to translate the digitized voltage signals to the frequency domain, perform a frequency response analysis on the translated digitized voltage signals to determine the ovaling mode frequency and the amplitude of the ovaling mode, compare the ovaling mode frequency and amplitude to a reference ovaling mode frequency and amplitude, and output a structural integrity report of the cylindrical object.

In another exemplary embodiment, a method for determining the structural integrity of a cylindrical object of height H and diameter D is described, comprising installing two diametrically opposed vibration inducers on an outer perimeter of the cylindrical object at a height $H_1$, installing two diametrically opposed vibration sensors around a perimeter of the cylindrical object at a height $H_2$, each vibration sensor installed halfway between the two vibration inducers, wherein $H_1<H$, $H_2<H$ and $H_1-H_2$ is in the range of 3 to 10 inches, synchronously actuating, by a signal generator, the two vibration inducers at a time t=0, receiving, by the vibration sensors, vibrations induced in the cylindrical object by the vibration inducers, each vibration sensor generating voltage response signals, adding, with a summer, the voltage response signals, amplifying, with a signal amplifier, the voltage response signals, digitizing, with an A/D converter, the amplified voltage response signals, translating, by a computer having at least one processor including program instructions including a Fast Fourier transform, the digitized signals to the frequency domain, performing, by the computer, a frequency response analysis on the translated digitized voltage signals, determining the ovaling mode frequency and the amplitude of the ovaling mode based on the frequency response analysis, comparing the ovaling mode frequency and amplitude to a reference ovaling mode frequency and amplitude, and outputting a structural integrity report of the cylindrical object on a display.

In another exemplary embodiment, a system for determining the stiffness and structural integrity of a cylindrical object, comprising generating, by two diametrically opposed vibration inducers placed at the same height on the surface of the cylindrical object, synchronous vibrations in the cylindrical object, receiving vibrations, by two diametrically opposed vibration sensors, each placed halfway between the two vibration inducers, and generating voltage signals representative of the vibrations, adding the voltage signals, by a summer, and recording their relative phase differences, processing, by a computer including circuitry and at least one processor having program instructions, the voltage signals to determine the ovaling mode frequency and the amplitude of the ovaling mode, generating a computer model of the cylindrical object, comparing the computer model to a reference database, outputting, on a display, a structural integrity report and stiffness of the cylindrical object. The processing further comprises amplifying, with a signal amplifier, the voltage signals, digitizing, with an A/D converter, the amplified voltage signals, translating, by program instructions including a Fast Fourier transform, the digitized signals to the frequency domain, performing, by the computer, a frequency response analysis on the translated digitized voltage signals, determining, by the computer, the stiffness of the cylindrical object under test by the comparing the ovaling mode frequency to a reference ovaling mode frequency, determining the strength of the cylindrical object under test by the comparing the amplitude of the ovaling mode to the amplitude of a reference ovaling mode, and including the stiffness and the strength in the structural integrity report.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
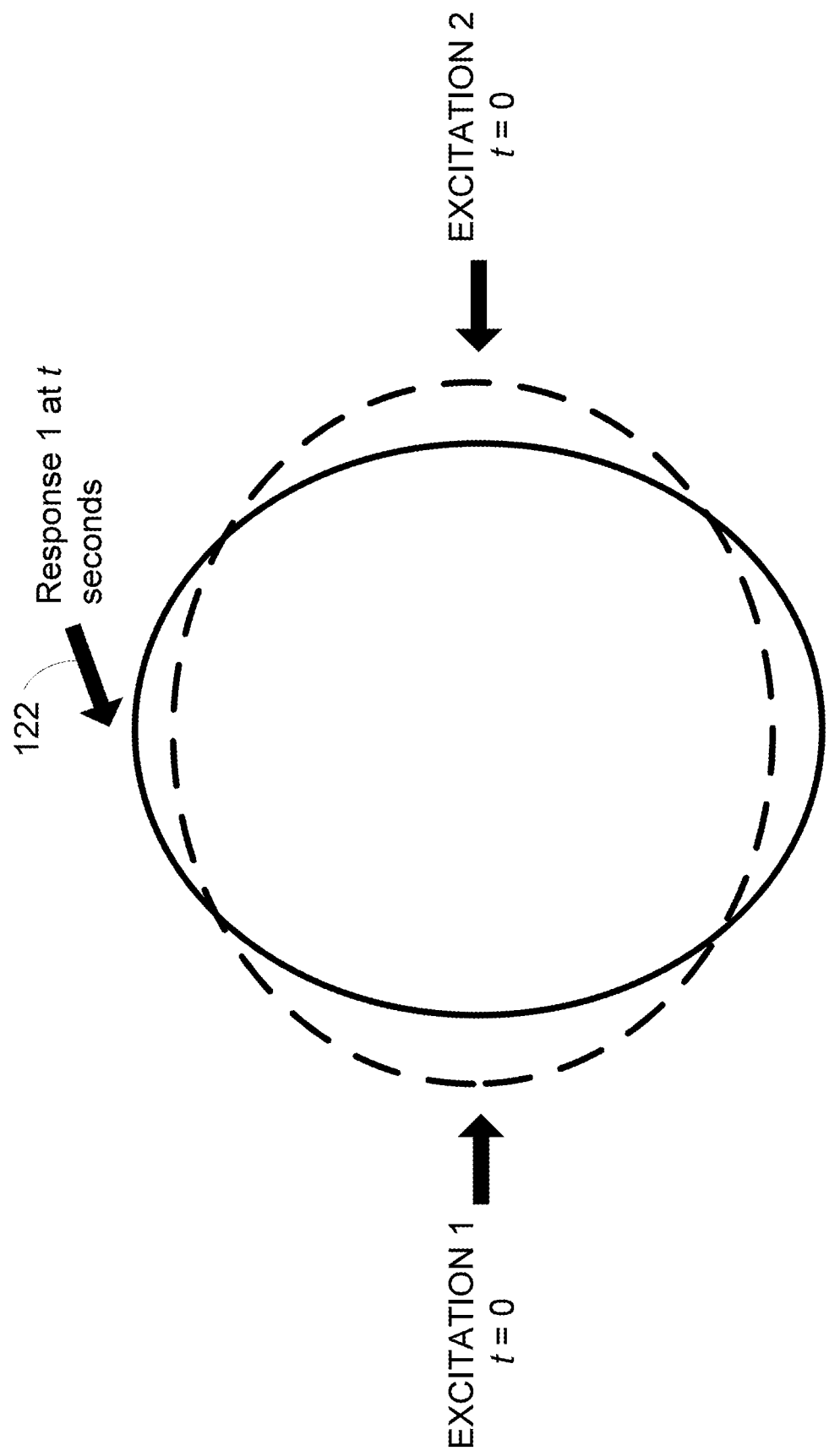
FIG. 1A is an illustration of the ovaling mode for an excitation by two vibration inducers and received by one vibration sensor.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a testing apparatus and method for determining the structural integrity of a cylindrical object and a system for determining the stiffness and structural integrity of a cylindrical object.

An objective of the present disclosure is to provide an accurate, effective, and relatively inexpensive technique for inspecting elements of cylindrical shape. Application of the techniques of the present disclosure can also be extended to cylindrical specimens of any solid material, either filled or hollow. Examples of elements to which the technique can be applied are logs and poles of various wood species, tree stems, metallic poles, concrete columns and pillars, cisterns and the like, or any cylindrically shaped element of other materials, such as wooden poles, logs or tree trunks.

An aspect of the present disclosure describes a method for analysis and for generating a final assessment of the structural integrity of the element under test.

In another aspect, a portable apparatus for testing cylindrical elements is described. A portable apparatus may include vibration generators, vibration sensors, signal acquisition hardware and a laptop or other computer with hardware/software configured to digitally convert and analyze the analog signals recorded from the test element.

It is another objective of this invention to provide a structural resonant frequency testing method which is simple to perform, fast, accurate and inexpensive.

Ovaling deformations of a thin-walled shell structure are defined as a deformation of the cross section of the structure without bending deformation in the longitudinal axis of symmetry. The ovaling mode is the second order resonant frequency in the extensional, or axial, direction. The second order resonant frequency is typically less than 2000 Hz. This mode of vibration is characterized by the fact that the cross-section of the cylinder is deformed under the effect of the excitation, but the axis of the cylinder, and although it can move under the vibration, remains as the axis of symmetry. In other words, the cylindrical element under test undergoes shaking, not bending. Moreover, as the ovaling mode is an extensional mode of vibration in cylindrical elements, its action is restricted to the cross-section of the element and is therefore affected to a very low degree, or not at all, by the length of the element in the axial direction.

The ovaling mode for a cylindrical structure is related to its structural integrity. A shift in the magnitude of the resonant frequencies toward lower values indicates a structural fault, such as deterioration due to wood attacking insects or fungi in wood, stress cracks in concrete or corrosion in steel and inhomogeneity in polymer matrixes. The relative shift in the magnitude of the resonant frequency of the ovaling mode is directly related to the extent of strength degradation due to a fault in the structure.

Mathematical models for the exact expression of this relative shift may be established for concrete and metals but are harder to formulate for wood and polymer matrixes as these materials are available in wide varieties. Different species of trees or differences resulting from the growth of trees under widely varying climate conditions and soil types may shift the relative change in resonant frequency. Wood is also a challenging material to test with physical and mathematical modelling due to the anisotropic characteristics of its properties which differ in their radial and longitudinal directions, which is exhibited by the concentric configuration of the tree rings, for dicotyledon tree species, but does not apply for monocotyledon species such as palm trees. Likewise, mathematical models for polymer materials can vary greatly due to difference in the physical and chemical properties of the polymer, such as molecular weight and chemical composition.

For a non-perfectly cylindrical specimen, such as a wooden pole or a tree trunk, the response of the ovaling mode on the frequency scale may depend on the taper, or change in geometrical shape along the axis of the element. For a wooden pole, which can be modelled as a beam clamped at one of its ends (i.e., attachment at the ground level), a further consideration is the general condition of the portion of the structure above the ground. In accordance with the present disclosure, the wood species must be a factor in the mathematical model. Similarly, for concrete, polymer or steel constructions, the concrete, polymer and steel compositions must be factors in the model.

The resonant frequency of the ovaling mode of a specimen can be determined by measurement of its surface vibrations with at least one vibration sensor attached to the specimen. At least one sharp spike holding a vibration sensor may be fixed or screwed near the base of the specimen, or in a region of concern. In a non-limiting example, the vibration sensor may be a piezoelectric transducer. In a non-limiting example, the piezoelectric transducers for tree measurements may be the 4371 piezoelectric force transducer manufactured by Brüel & Kjaer. (See "Type 4371-Bruel &Kjaer Sound and Vibration", Bruel & Kjaer North America Inc. (HQ), 3079 Premiere Parkway, Suite 120, Duluth, Ga. 30097, U.S.A.)

United States An electrical voltage response equivalent, to the vibratory motion of the structure is acquired through the at least one sensor. The electrical response is converted to a digital signal and then transformed into the frequency domain for determining the frequencies of the modes of interest. The resonant frequency of the ovaling mode of the element is then compared to that of a sound element with comparable cross-sectional size to establish the stiffness and soundness degree of the cylindrical element.

In order to differentiate between the various vibration modes of the specimen under test, and more specifically to enhance and isolate the ovaling mode from the overall frequency response, two identical synchronous vibration inducers are attached at diametrically opposite positions on the surface of the cylindrical structure. The vibration requirement for the ovaling mode is that the two diametrically opposite vibrations induced are in phase, i.e. they are simultaneously at a maximum of vibration, or at a minimum vibration at an odd number of half periods later. The use of two synchronous vibrators distributes the vibrations more evenly around the axis of the cylindrical structure. The synchronicity of the vibrations causes superposition of equal but opposite waves of equal amplitude and frequency, yielding a standing wave of twice the amplitude of either of the generated waves. For a standing wave, the harmonics can be identified as n=1, n=2, etc., where n=2 is the ovaling mode. In the field, a pair of similar and synchronized hammers, or equivalent device may be used to generate simultaneous strikes.

In a first aspect of the present disclosure, a single vibration sensor is used to record the frequency response.

The analog signal collected by the vibration sensor is then conveyed to a measurement system. The measurement system processes the signal by first digitizing it at an appropriate sampling frequency in view of further processing and analysis. The processing includes submitting the digitized signal to a discrete Fourier Transform, FFT, for the acquisition of the frequency response and amplitudes of the resonant frequencies. Alternatively, the analog vibration signal can be stored on a tape or on a digital medium to be replayed for processing and analysis at a later opportunity. The ovaling mode is isolated and compared to charts or database records which correlate the ovaling frequency to a fault or faults in the cylindrical test element. Further, the amplitude of the ovaling frequency correlates to the size of the fault. From this information, a structural integrity report can be made regarding the cylindrical element.

In a second aspect of the present disclosure, in order to differentiate between the various vibration modes of the cylindrical test structure, and more specifically to isolate the ovaling mode from the overall frequency response, excitation stress waves are propagated in the cylindrical structure by using two diametrically opposed vibration inducers as described in the first aspect. However, in the second aspect, two identical vibration sensors are used to pick up the vibrations. These vibration sensors are placed on the face of cylindrical element at two diametrically opposed positions and are attached at ninety degrees from the point of application of the exciting forces in order to enhance the response of even modes and reduce that of odd ones.

The signal responses, in the form of in-phase impulse responses, are collected from the sensors. The analog signals collected by the vibration sensor are then summed and transmitted to the measurement system. The measurement system processes the signals by first digitizing them at an appropriate sampling frequency in view of further processing and analysis. The signals from the sensors are then added and the resulting signal sum is subsequently converted into a digital signal to be afterwards transformed into the frequency domain through a Fourier transform. The amplitude of the obtained transfer function is analyzed for determining the frequencies of the modes of interest. The resonant frequency of the ovaling mode of the element is then compared to that of a reference sound element with a comparable cross-sectional size and element type and composition to establish the stiffness and soundness degree of the inspected cylindrical element. From this information, a structural structural integrity report can be made regarding the cylindrical element.

For a hollow cylindrical element, the vibration sensors will detect differences in the walls, such as faults or cracks. In this situation, two sensors must be used, as the vibrations detected by each sensor are out of phase and subtract when combined in the summer. The signals processed are the difference signals of the two sensor measurements.

For an irregular cylindrical object, such as a tree trunk, the difference signals will indicate the irregularity. A baseline irregularity may be subtracted from the processed signals during analysis, to reveal any structural faults, rot, or deterioration within the cylindrical object.

As mentioned earlier this testing method may also be used for even extensional modes of order higher than two. In such case and in comparison with a thin cylindrical shell, the circumference of the cylinder would correspond to an even multiple number of bending wavelengths. The processing includes submitting the digitized signals to a discrete Fourier Transform, FFT, for the acquisition of the frequency response and amplitudes of the resonant frequencies. The ovaling modes are isolated and compared to charts or database records which correlate the ovaling frequency to a fault or faults in the cylindrical test element. Further, the amplitude of the ovaling frequency correlates to the size of the fault. From this information, a structural integrity report can be made regarding the cylindrical element. For either the first aspect, having a single vibration sensor, or the second aspect, having two, diametrically opposed vibration sensors, the structural structural integrity report for a concrete pillar may indicate that the pillar is sound or needs replacing. Similarly, the structural structural integrity report for a standing tree may indicate that the tree trunk is structurally sound, making it a good candidate for further processing, or that it is rotted, and resources should not be wasted on cutting it down. Additionally, the testing may be used in forest management, to determine which trees are diseased or likely to fall in high winds. Measures can be made to treat the infestation or to remove or isolate the tree to avoid damage to surrounding healthy trees. A further objective is to provide for the material fatigue and the detection of defects, either structural or resulting from strength weakening process operating within the material, for elements of cylindrical shape.

In either the first or second aspect, the analog vibration signals may alternatively be stored on a tape or on a digital medium to be replayed for processing and analysis at a later opportunity or sent to a remote processing center.

FIG. 1A illustrates the ovaling mode for the first aspect having a single sensor placed halfway between the two excitations as shown in a cross sectional view of a cylindrical test element. The synchronous excitation of the cylindrical element by two diametrically opposed excitations at time t=0 is illustrated by the dotted line. The maximum amplitude response at t seconds is shown by the solid line and indicated by the arrow 122.

Figure 1B:
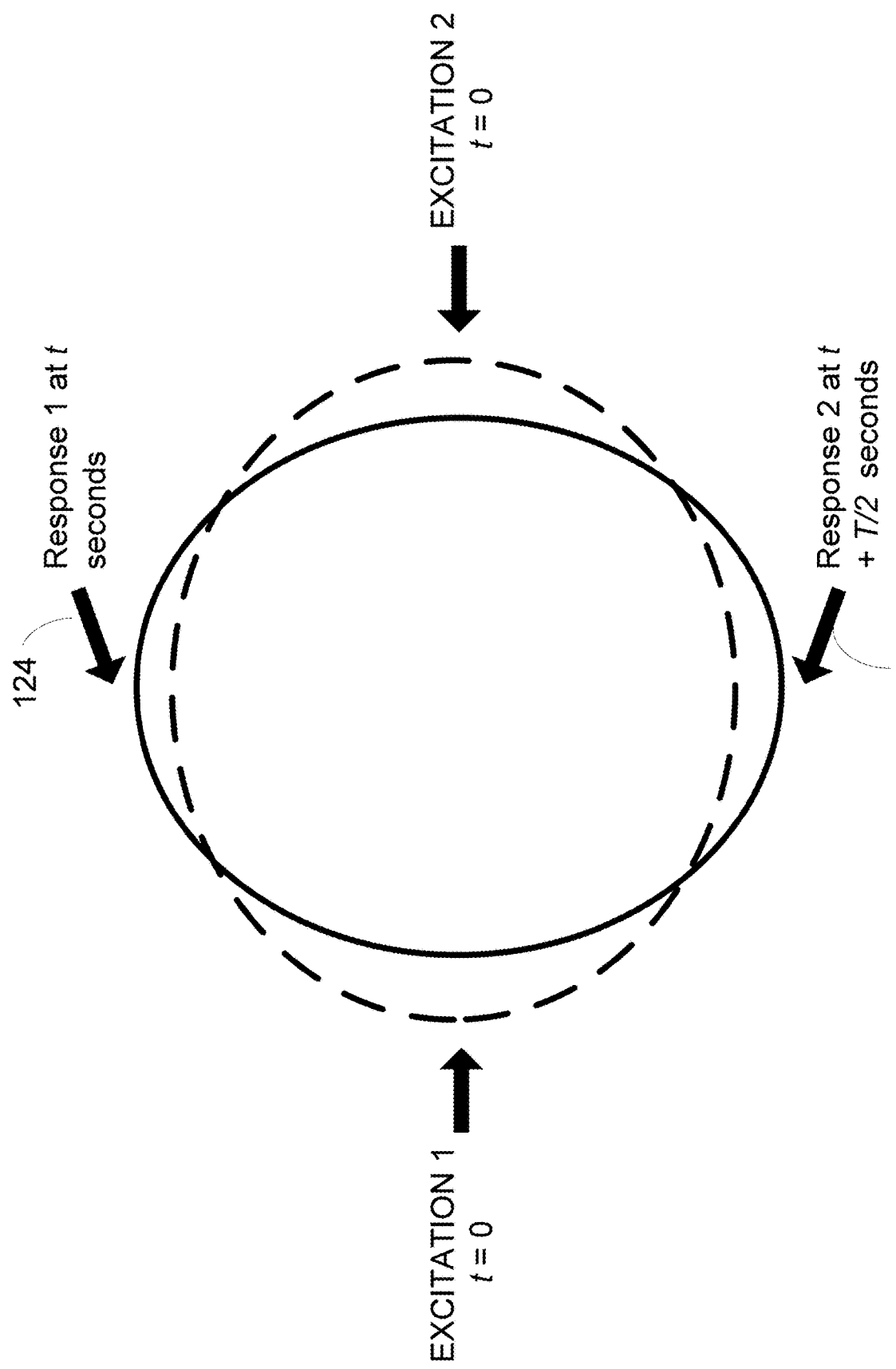
FIG. 1B is an illustration of the ovaling mode for an excitation by two vibration inducers and received by two vibration sensors.

FIG. 1B illustrates the ovaling mode for the second aspect having two diametrically opposed sensors, each placed halfway between two excitations, as shown in a cross sectional view of a cylindrical test element. The synchronous excitations of the cylindrical element by two diametrically opposed two excitations at time t=0 is illustrated by the dotted line. The maximum amplitude response at t seconds is shown by the solid line and indicated by the arrow 124. The maximum amplitude response at the second sensor is at t=t+T/2 seconds, where T is the period of the resonant frequency (the excitation frequency which causes the resonance).

Figure 2A:
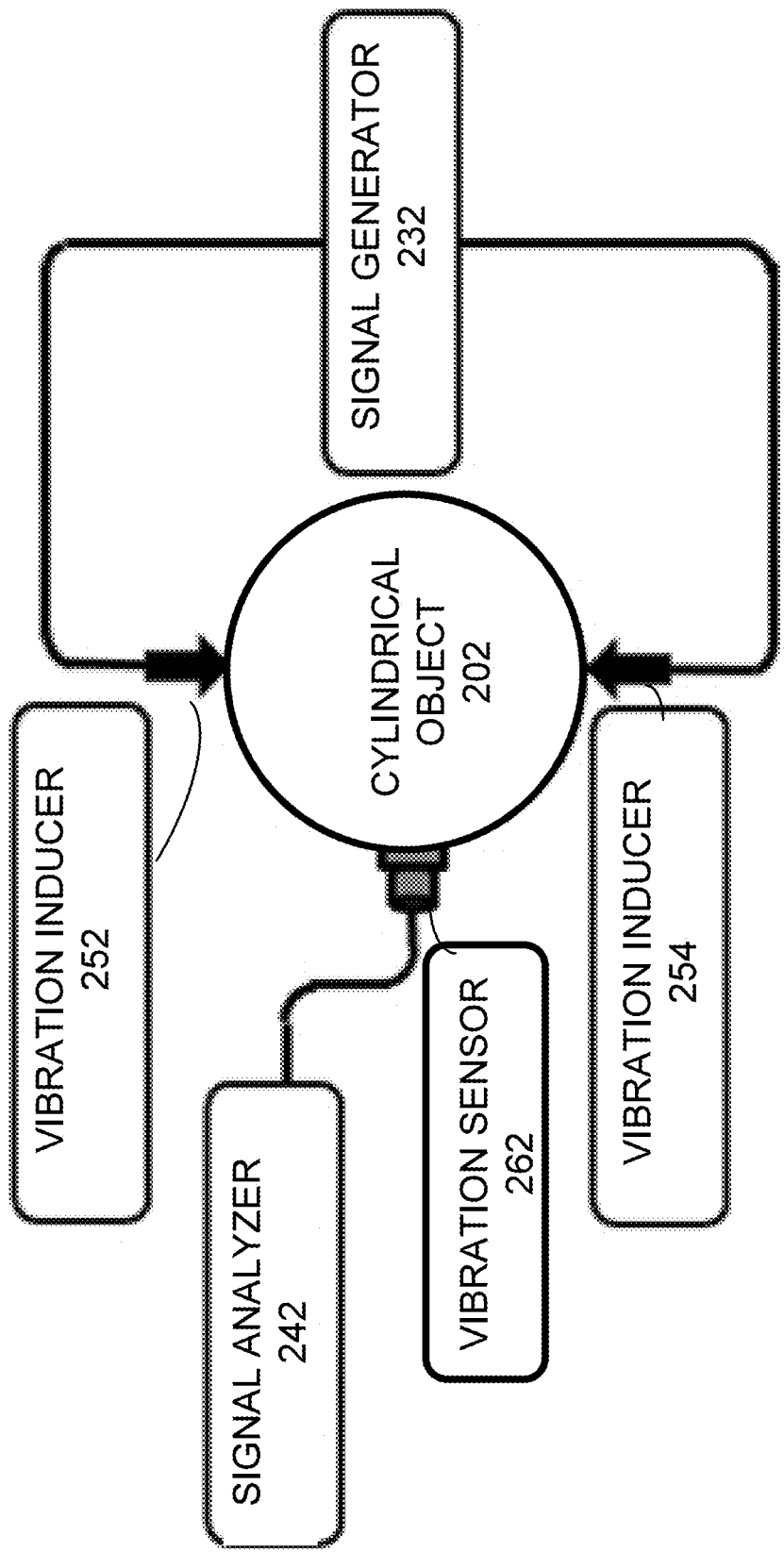
FIG. 2A is an illustration of the apparatus for determining the ovaling mode of a cylindrical object using one vibration sensor.

FIG. 2A illustrates the measurement apparatus for a cylindrical object 202 for the first aspect. For the purposes of measurement, the cylindrical object is considered to be mounted (or grown, in the case of a tree) upon a ground plane with its axial length perpendicular to the surface. A vibration inducer 252 is placed on the cylindrical object at a height H1, from the ground plane, corresponding to the desired testing region. A second vibration inducer 254 is placed at the same height in a position diametrically opposed to the first vibration inducer 252, that is, on the outer surface of the cylindrical object, the location of the vibration inducers is on either end of a diameter of a cross-sectional slice. Each vibration inducer is electrically connected to a signal generator 232. A single vibration sensor 262 is attached to the cylindrical object. The sensor 262 is attached at a location along the cylindrical surface which is 90 degrees from either vibration inducer and at a height, H2, which is a few inches above or below H1. The sensor 262 is attached by a spike, in the case of a wooden test element, or by epoxy, in the case of a concrete or steel test element Alternatively, the vibration sensor may be attached by bolts inserted into holes drilled in the test surface, although this method may not be feasible in some instances, as it may be destructive to the structural integrity or the esthetics of the cylindrical test object. The vibration sensor 262 is attached to a signal analyzer 242, which is part of the measuring system aforementioned, embodied in a laptop, handheld tester or other computer.

Figure 2B:
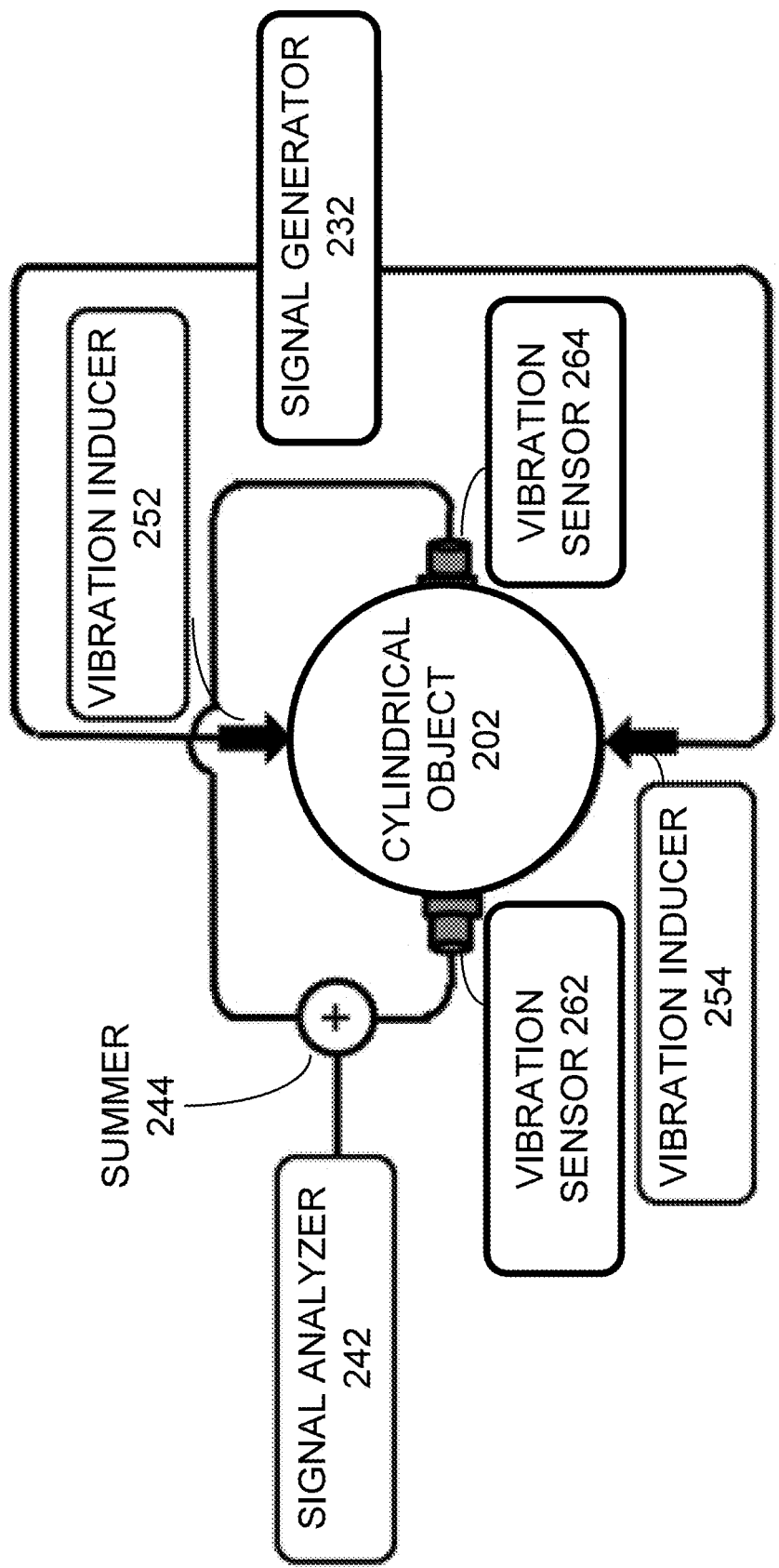
FIG. 2B is an illustration of the apparatus for determining the ovaling mode of a cylindrical object using two vibration sensors.

FIG. 2B illustrates the measurement apparatus for a cylindrical object 202 for the second aspect. The measurement setup is similar to the one described for FIG. 2A, however, in this aspect, two diametrically placed vibration sensors 262 and 264 are attached to the cylindrical object. The sensors 262 and 264 are attached at a location along the cylindrical surface which is 90 degrees from either vibration inducer and at a height, H2, which is a few inches above or below H1. The vibration sensors 262 and 264 are electrically connected to a summer 244, which is connected to a signal analyzer 242, which is part of the measuring system aforementioned, embodied in a laptop, handheld tester or other computer.

Figure 3A:
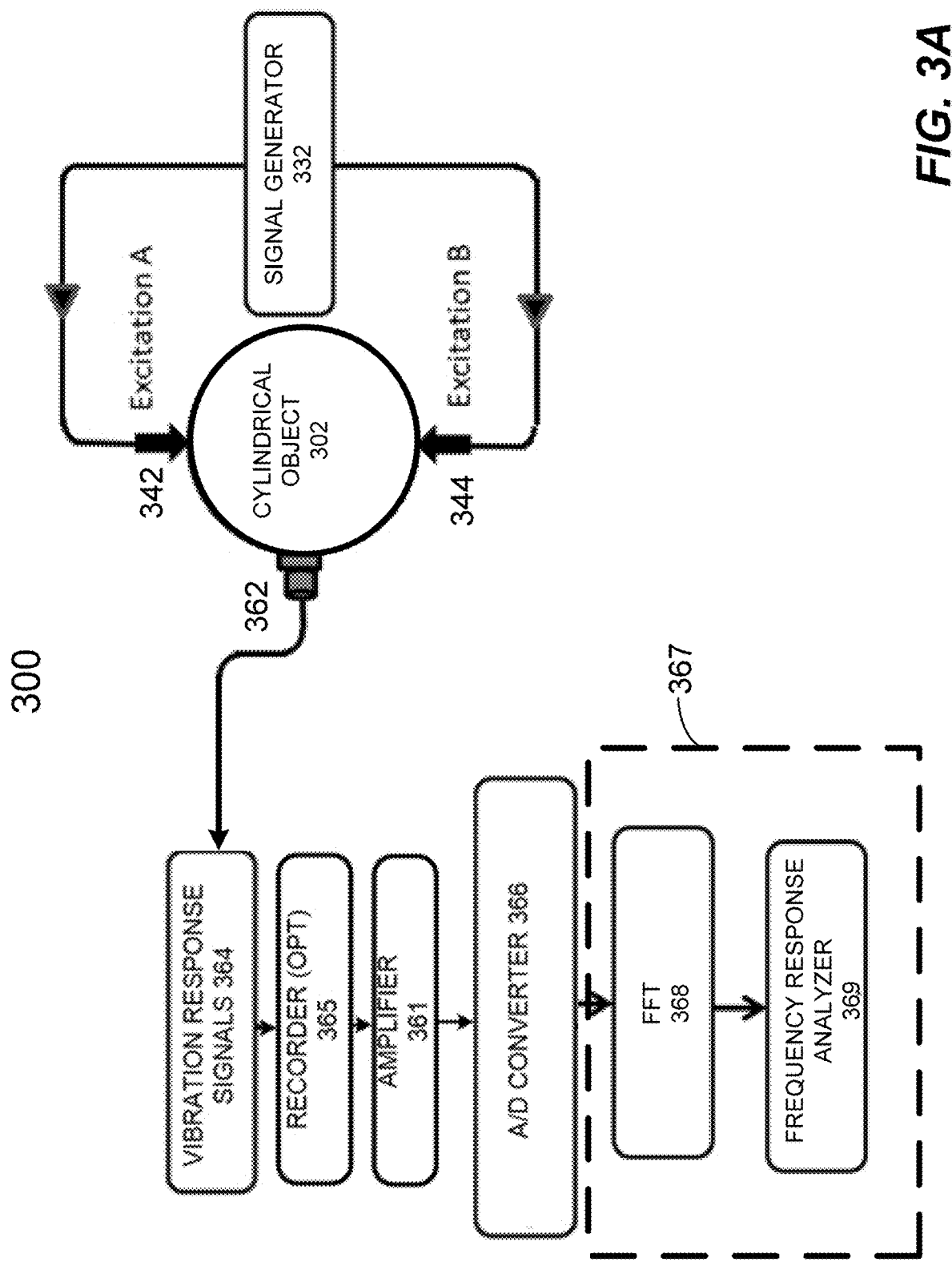
FIG. 3A is a diagram of the measurement system for one vibration sensor.

FIG. 3A represents a block diagram of the testing apparatus 300 for the first aspect. A vibration energy source, a signal generator 332, is employed to initiate the transient vibration of the specimen under test, cylindrical object 302, which may be any cylindrically shaped element of solid material. For a wooden pole in service or a standing tree, the energy source is preferably located three to four feet from the ground-line. Two identical in-phase force-generating transducers, vibration inducers 342 and 344, are firmly attached to the surface of the cylindrical object, on the same plane and normal to the axis of the cylindrical test object, but on diametrically opposed positions. The sensing transducer, vibration sensor 362, is placed at 90 degrees or halfway between and a few inches above or below the position of the vibration inducers 342 and 344, in order to avoid positions of local deformations and near fields caused by the excitation generators that may interfere with the ovaling mode response and complicate its characteristics by adding noise. The vibration inducers 342 and 344 may be simultaneous hammer strokes and the vibration sensor 362 may be a piezo-electric accelerometer.

The vibration sensor, 362, generates electrical signals 364, in the form of voltages, in response to the vibratory surface excitation of the cylindrical object 302. The vibration response signal 364 may be conveyed to an optional signal recorder, 365, which may be a computer memory, a register, or other means of recording signals. The recorder may save the signals for later processing and analysis at a suitable later time and location. Alternatively, the vibration signals may be analyzed on-site, in which case the recorder is not needed. In a non-limiting example, the signal recorder may be a Paperless Recorder/Data Acquisition System, Item #RD8800-C24, available from Omega Engineering, 800 Connecticut Ave. Suite 5N0 Norwalk, Conn. 06854 USA.

The recorded signal of the cylindrical test object 302 is preferably transmitted to an analog-to-digital converter 366, which digitizes and converts the signal into a form that is usable by computer hardware and software. The signal is then fed into a computer, 367, equipped with analysis software operating on digitized data and which executes a Fast Fourier Transform (FFT) 368 on the digitized signal. The FFT operation results in a translation of the signal into the frequency domain. The resonant frequencies and their amplitudes are then identified and the $2^{nd}$ order harmonic, or ovaling mode frequency, is determined by a frequency response analyzer 369. The computer 367 includes a processor and software instructions configured for determining the stiffness condition of the cylindrical object 302 by comparing the ovaling mode frequency and amplitude to database records relating reference ovaling modes of flawless cylindrical objects for similar material compositions, locations and the cross-sectional dimensions.

The computer is further configured to compare the amplitude of the ovaling mode to a reference amplitude for the ovaling frequency and to output a structural integrity report for the cylindrical test object based on the difference between the amplitudes. For example, a relative amplitude difference of 20% may indicate a weakened structure, such as insect infestation in trees or wooden poles or stress cracks in concrete, where a relative amplitude difference of 40% may indicate a cylindrical object which is unusable or may need replacement.

The structural integrity report may be output on a simple lighting display on the computer housing. For example, three main soundness regions, can be adopted, namely "green" when the strength of the tested element is above 75% of the reference sound cylinder of corresponding size, "orange" if the value is below 75% but above 50%, and "red" if it is less than 50%. For wood elements the strength of the element is depending on the degree of its affection by rot, for steel it may be rust, and for concrete it may be corrosion. Moreover the change of material strength is not due only to the change of the material properties at the microscopic level, but may be due to the presence of strength-weakening defects (knots and cross-grain for wood, or voids, delamination and external agents in concrete and steel), poor processing of the material or due to a defective operation during its manufacturing (casting, filling, tempering, cooling) These defects may be estimated from the change in the value of the frequency of the ovaling mode.

The cylindrical test object 302 may be a building element. To perform the test, an operator makes note of the material constituting element 302, the diameter of the element, and other defining characteristics such as location and humidity. The operator then inputs the characteristics of the cylindrical test object 302 into the computer 367 by means of a simple keyboard 788 or computer interface 786 (see FIG. 7). The operator then sets the cylindrical test object into vibration by means of a pair of synchronized identical hammers, 342 and 344, of appropriate size and suitable tip hardness in order to excite the ovaling mode of vibration. The hammer impacts may be at any location on the cylindrical test object 302 but are preferably located about three feet up from the ground line. The strokes of the hammers are to be directed in a radial direction on the surface of the cylinder. A vibration sensor 362 is firmly attached on the surface of the cylindrical object 302, at half the distance between the sites of the hammer impacts 342 and 344 and a few inches below. At this position, the ovaling mode has a pronounced response, i.e., the trough or anti-node position of the vibration mode.

Wiring or a cable transports the vibration response signal 364 sensed by vibration sensor 362 to a (optional) recorder 365 for later analysis at a remote processing site. Should in-site measurements be made and analyzed, recorder 365 can be by-passed and analog signal is converted into a digital signal by A/D converter 366 on which a Fourier transform 368 is applied on a laptop or other computer hosting software having a frequency response analyzer 369. The amplitude of the resulting frequency response as then processed by the software in the computer 367 is then studied and the resonance frequency of the ovaling mode is read by the operator and compared to the value on a reference curve for a cylinder of a corresponding size. The reference curve is drawn for the frequency values of the ovaling mode of a sound cylinder as a function of its cross-sectional size (diameter or perimeter). Alternatively, the computer has circuitry including at least one processor and software instructions directing the processor to determine the ovaling mode and compare it to a database of ovaling modes to identify the strength or degradation of the cylindrical test object 302. In either case, the relative decrease of the value of the resonance frequency of the ovaling mode gives then information on the stiffness status of the material. In a non-limiting example, the stiffness status may be classified it as sound (green on a color scale), acceptable (yellow), weak (orange) or to be discarded (red) for example, as may be shown by a light panel, on a computer display or printed on a printer.

FIG. 2B is a representation of the measurement set-up for isolating the ovaling mode through setting the cylindrical element into vibration by means of two identical con-phase force generators, vibration inducers 252 and 254, mounted at diametrically opposed positions on the cylinder. In this aspect, two diametrically placed vibration sensors 262 and 264 sense the vibrations induced within the cylindrical object 202 by the vibration inducers 252 and 254 and output voltage signals to the summer 244 which combines the signals and sends them to the signal analyzer 242 for processing.

Figure 3B:
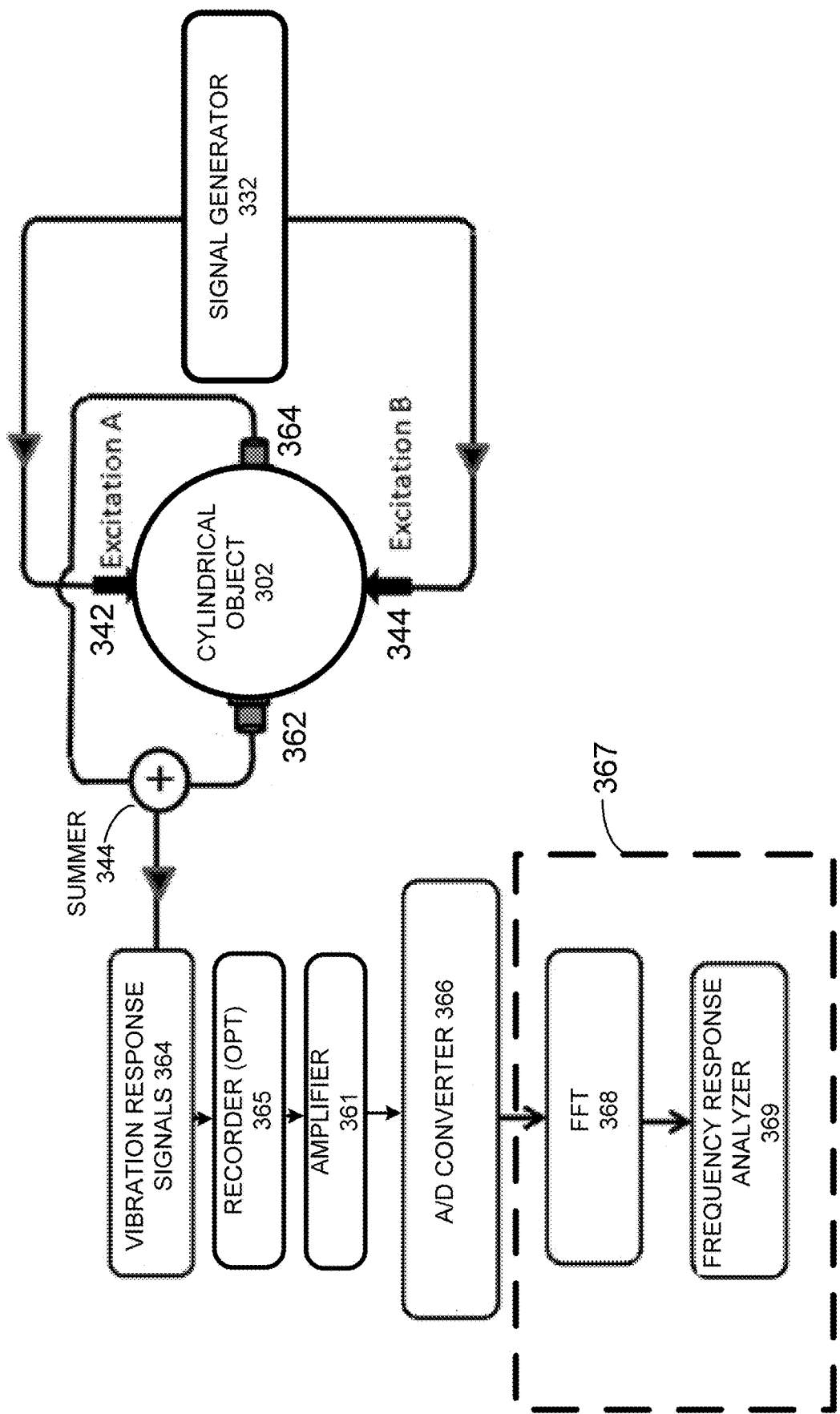
FIG. 3B is a diagram of the measurement system for two vibration sensors.

FIG. 3B illustrates the processing of the signals of FIG. 2B. The signals generated in response to the actuation of the vibration inducers 342 and 344 by signal generator 332 and received by the two vibration sensors 362 and 364 are fed into the analog signal summer 344 and are outputted as a train of vibration response signals 364. If the analysis is to be done on-site, recorder 365 may be bypassed and the signal sum is in this case conveyed to analog-to-digital converter 366. The digitized data is fed into digital computer 10, hosting the necessary software for analysis of digital transient trace. The signal analyzer 242 of FIG. 2B includes the recorder, A/D converter, and the computer 367, which includes circuitry and at least one processor accessing program instructions configured to execute the FFT 368, and provide the results to the frequency response analyzer 369.

In a non-limiting example, the signal generator may be the Keysight Technologies 33210A Signal Generator, available from allied Electronics and Automation, Allied Electronics, Inc., 7151 Jack Newell Blvd. S., Fort Worth, Tex. 76118 U.S.A.

Referring to FIG. 3B, the testing method is described. A signal generator, 332, feeding a pair of identical in-phase force transducers, vibration inducers 342 and 344, acting as sources of vibratory energy, are employed to initiate the transient stress vibration in the body of the specimen under test, such as a construction column, a log, a pole of any solid material, a tree trunk or any cylindrically shaped element of solid material. For a wooden pole in service or a standing tree, the vibration inducers are preferably located three to four feet from the ground plane. The vibration inducers are firmly attached to the surface of the cylindrical object, on the same plane and normal to the axis of the cylindrical test object, but on diametrically opposed positions. For field measurements the vibration sources may be a pair of identical synchronous hammers. The sensing transducers, 362 and 364, are placed a few inches above or below the position of the excitation signals, in order to avoid positions of local deformations and near fields caused by the excitation generators that may interfere with the ovaling mode response and blur its physical characteristics by adding noise. The vibration inducers 342 and 344 may be simultaneous hammer strokes and the vibration sensors 362 and 364 may be piezo-electric accelerometers.

The transient signals recorded by the vibration sensors are then conveyed to an electronic summer 344 where the addition of signals from 362 and 364 forms a vibration response signal train 364. The vibration response signal train 364 may be analyzed on-site, or it may be recorded, in optional recorder 365, which may be a computer memory, a register, or other means of recording signals, for later processing and analysis.

The signals may be saved in recorder 365. At a suitable later time and location, the vibration response signals 364 may be played back into a non-inverting amplifier which increases the voltage response and then to an analog-to-digital converter, 366, which digitizes and converts the signal-sum into a form that is usable by computer hardware and software. Alternatively, the recorder 365 may be bypassed and the vibration response signals 364 may be fed directly into the A/D converter 366. In either case, the signal is then fed into a computer 367, equipped with analysis software operating on digitized data and which executes a FFT, 368, on the digitized signals. The FFT operation results in a frequency response, or a transfer function, TF, which translates the digitized signals into the frequency domain. The resonant frequencies and their amplitudes are then identified and the $2^{nd}$ order harmonic, or ovaling mode frequency, is determined by a frequency response analyzer 369.

The resonant frequencies are graphed and the amplitude of the TF and the frequency of the ovaling mode is identified. The computer, 367, also has a routine for determining the strength condition of the cylindrical test object, depending on its material and location as well as its cross-sectional dimension given either as its perimeter or its average diameter at the position of the measuring vibration sensors 362 and 364. The computer 367 includes a processor and software instructions configured for determining the stiffness condition of the cylindrical object 302 by comparing the ovaling mode frequency and amplitude to database records relating reference ovaling modes of flawless cylindrical objects for similar material compositions, locations and the cross-sectional dimensions.

The computer is further configured to compare the amplitude of the ovaling mode to a reference amplitude for the ovaling frequency and to output a structural integrity report for the cylindrical test object based on the difference between the amplitudes. For example, a relative amplitude difference of 20% may indicate a weakened structure, such as insect infestation in trees or wooden poles or stress cracks in concrete, where a relative amplitude difference of 40% may indicate a cylindrical object which is unusable or may need replacement.

In this circuit the signal may be applied to the non-inverting input of an op-amp 765. The feedback is taken from the output of the op-amp via a resistor R1 to the inverting input of the operational amplifier where another resistor R2 is referenced to ground. It is the value of these two resistors that govern the gain of the operational amplifier circuit as they determine the level of feedback.

As the input to the op-amp draws no current this means that the current flowing in the resistors R1 and R2 is the same. The voltage at the inverting input is formed from a potential divider consisting of R1 and R2, and as the voltage at both inputs is the same, the voltage at the inverting input must be the same as that at the non-inverting input. This means that Vin=Vout×R1/(R1+R2). Hence the voltage gain of the amplifier is: $V_G$=1+R2/R1. In a non-limiting example, the value of R2=200 Ω and the value of R1=100 Ω, thus the amplitudes of the voltage signals are multiplied by 2.

The cylindrical test object 302 may be a building element. To perform the test, an operator makes note of the material constituting element 302, the diameter of the element, and other defining characteristics such as location and humidity. The operator then instructs the computer in the instrument 11, by means of a simple keyboard, about the test specimen 1 characteristics (material, diameter). The operator then inputs the characteristics of the cylindrical test object 302 into the computer 367 by means of a simple keyboard (enter number) or computer interface (enter number). The operator then sets the cylindrical test object into vibration by means of a pair of synchronized identical hammers, 342 and 344, of appropriate size and suitable tip hardness in order to excite the ovaling mode of vibration. The hammer impacts may be at any location on the cylindrical test object 302 but are preferably located about three feet up from the ground plane. The strokes of the hammers are to be directed in a radial direction on the surface of the cylinder. The pair of vibration sensors 362 and 364 are firmly attached on the surface of the cylindrical test object 302, at a quarter circle or ninety degrees from the sites of the impacts from the vibration inducers 342 and 344. At these positions, the ovaling mode has its most pronounced responses i.e. the troughs or anti-node positions of the vibration mode.

Wiring or cable transport the responses sensed by vibration sensors 362 and 364 to electronic summer 364 which outputs a train of vibration response signals 364. The vibration response signals 364 can be saved in recorder 365 for later analysis at a remote processing site. Should in-site measurements be made and analyzed, recorder 365 can be by-passed and analog signal is converted into a digital signal by A/D converter 366 on which a Fourier transform 368 is applied on a laptop or other computer hosting software having a frequency response analyzer 369. The amplitude of the resulting frequency response as then processed by the software in the computer 367 is then studied and the resonance frequency of the ovaling mode is read by the operator and compared to the value on a reference curve for a cylinder of a corresponding size. The reference curve is drawn for the frequency values of the ovaling mode of a sound cylinder as a function of its cross-sectional size (diameter or perimeter). Alternatively, the computer has circuitry including at least one processor and software instructions directing the processor to determine the ovaling mode and compare it to a database of ovaling modes to identify the strength or degradation of the cylindrical test object 302. In either case, the relative decrease of the value of the resonance frequency of the ovaling mode gives then information on the stiffness status of the material. In a non-limiting example, the stiffness status may be classified it as sound (green on a color scale), acceptable (yellow), weak (orange) or to be discarded (red) for example, as may be shown by a light panel, on a computer display or printed on a printer.

FIG. 4A, 4B, 5A, 5B, 6A, 6B show an experimental test apparatus and test results below.

Figure 7:
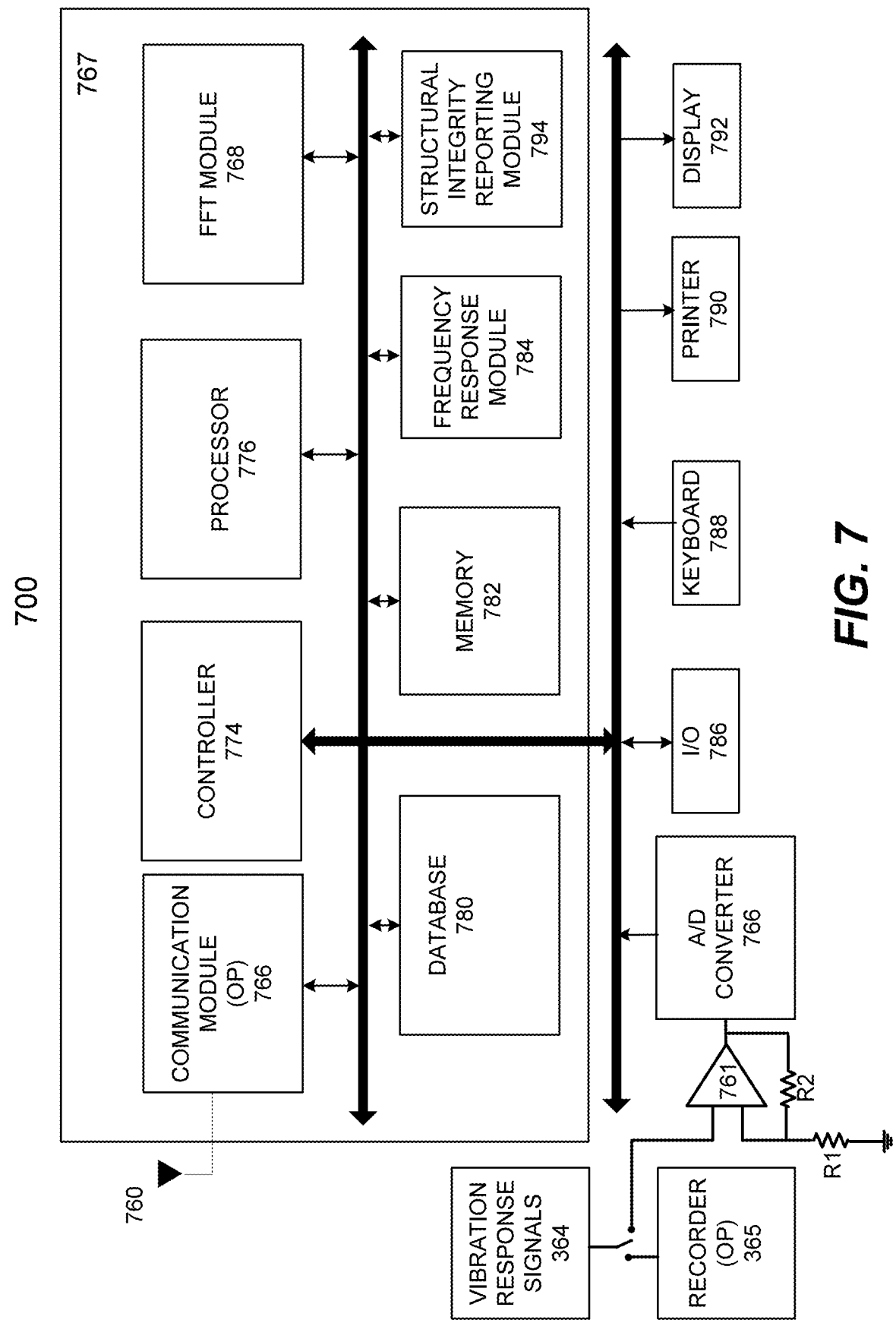
FIG. 7 is the computing environment for generating a structural integrity report for a cylindrical test object.

The computer system 767 for analyzing the impulse response signals and outputting the structural integrity report is shown in FIG. 7.

The computer system 767 may include a communication module 766 for wireless communication of the measurement results to a remote operator or monitoring station.

Controller 774 is connected to a processor 776, a database 780, storing ovaling data, a memory 782 including program instructions for utilization by the processor 776, an FFT module 768, a frequency response module 784 and a structural integrity reporting module 794. Additional circuitry and modules of the computer are described with respect to FIG. 8-10.

The computer system 767 is connected to the A/D converter 766, which receives vibration response signals 364 either from the measuring apparatus or from the recorder 365, depending on whether the analysis is to be conducted in the field or input to the computer system at a later time, respectively. These signals are amplified by an operational amplifier 367 and applied to A/D converter 366, which outputs the signals as digitized data.

The digitized data from the A/D converter is received by the controller 774 and sent to the processor 776. The processor sends the digitized data to the FFT module 768 for translation to the frequency domain. The frequency data is then sent to the frequency response module 784 to identify the resonant frequencies and specifically the ovaling mode frequency and its amplitude. The relative phase differences between the response signals yield information on the stiffness and size of faults due to stress, rot or disease in the cylindrical object. Alternatively, a plot may be output of the frequency response and printed on printer 790 or displayed on a computer monitor or display on a testing unit housing incorporating the computer system. In this alternative, an operator may identify the ovaling mode, and input the mode on keyboard 788 or by pressing buttons on a touch screen of the display or incorporated in the testing unit housing. The operator may match the test object parameters to a chart of reference parameters which identifies the ovaling mode expected for a structural integrity comparable cylindrical object, and compare the test ovaling mode to the expected ovaling mode.

An operator also inputs, through I/O interface 786 or keyboard 788, parameters of the cylindrical test object, such as diameter, material composition, humidity, visible degradation and location, which information is stored in the memory 782.

The processor receives the identified ovaling mode and retrieves the test object diameter, test object parameters from the memory and database records for a reference flawless cylindrical object of the same parameters and transmits this information to the structural integrity reporting module 794. The structural integrity reporting module compares the test ovaling mode and amplitude to the reference ovaling mode and amplitude to determine the degree of degradation, if any, of the test cylindrical object. For example, a relative amplitude difference of 20% may indicate a weakened structure, such as insect infestation in trees or wooden poles or stress cracks in concrete, where a relative amplitude difference of 40% may indicate a cylindrical object which is unusable or may need replacement. The controller then outputs the structural integrity report to the printer, the display or to the communication module for transmission to a remote operator or monitoring station.

The first embodiment is described with respect to FIG. 3A, 3B and FIG. 7. The first embodiment describes a testing apparatus for determining the structural integrity of a cylindrical object 302 (a single vibration sensor test is shown in FIG. 3A, a two vibration sensor test is shown in FIG. 3B), the cylindrical object having an outer surface, a height, H, and a diameter, D. The testing apparatus includes first 342 and second 344 vibration inducers, each attached to the outer surface of the cylindrical object at diametrically opposite positions at the same height H1, a signal generator 332 electrically connected to the first and second vibration inducers, at least one vibration sensor 362 attached at a position halfway between the vibration inducers and at a height H2, the vibration sensor configured to output voltage signals 364 representing sensed vibrations, a signal amplifier 361 configured to amplify the voltage signals, an A/D converter 366 configured to digitize the voltage signals, a computer 367 having circuitry and at least one processor 776 including program instructions configured to translate the digitized voltage signals to the frequency domain (FFT, 768), perform a frequency response analysis (frequency response module, 784) on the translated digitized voltage signals to determine the ovaling mode frequency and the amplitude of the ovaling mode, compare the ovaling mode frequency and amplitude to a reference ovaling mode frequency and amplitude, and output a structural integrity report of the cylindrical object (structural integrity reporting module 794).

The heights are measured with respect to the ground plane on which the cylindrical object is standing, where H1<H, H2 is less than H, and H1 is not equal to H2, and where H1-H2 is in the range of 3 to 10 inches.

Figure 8:
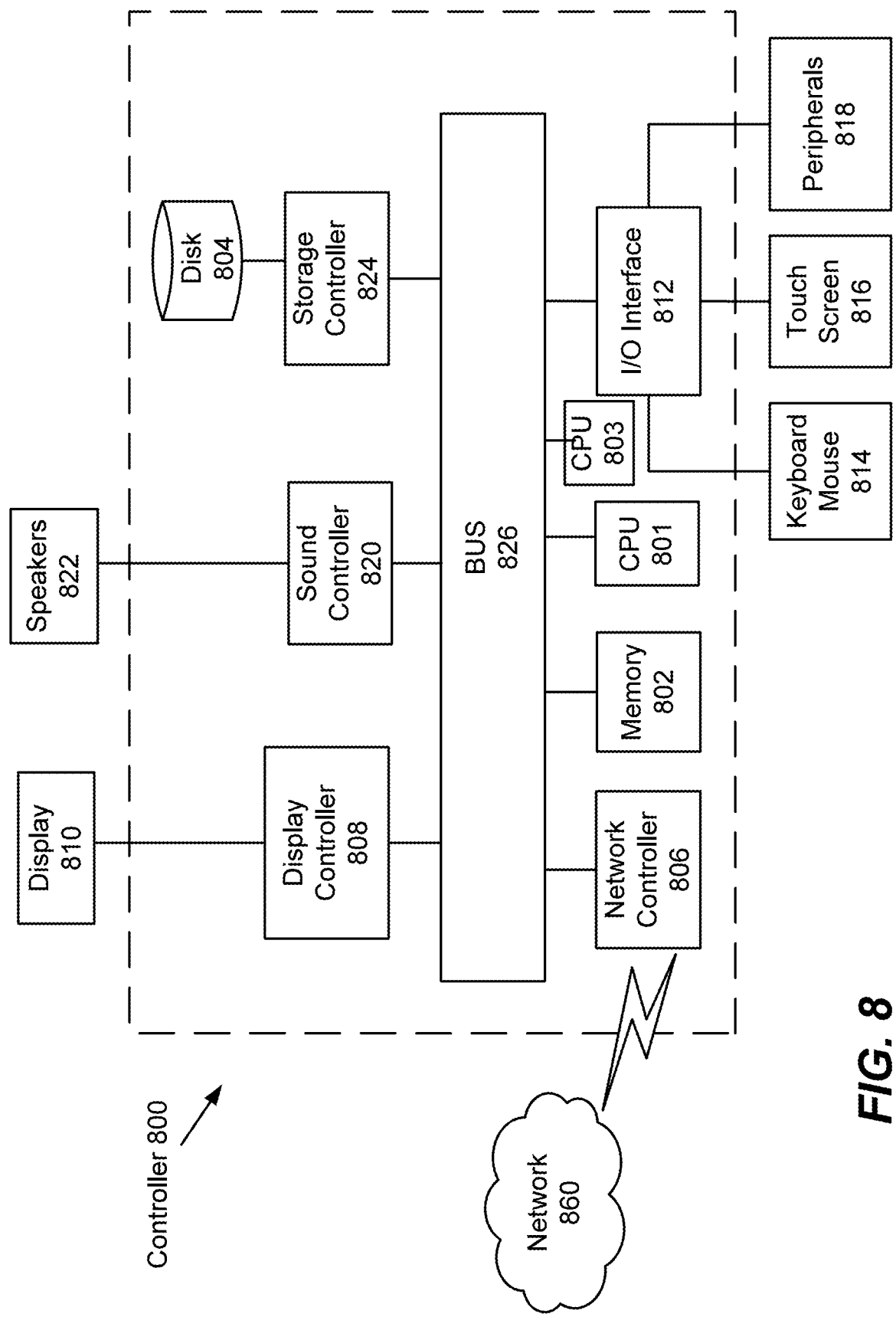
FIG. 8 is an illustration of a non-limiting example of details of computing hardware used in the computing system, according to certain embodiments.

The structural integrity report is output on any one of a computer monitor 792, a touch screen, a numerical display, a set of colored lights, a printer 790 and a speaker (822, FIG. 8).

The at least one vibration sensor may comprise a first vibration sensor 362 and a second vibration sensor 364, wherein the second vibration sensor is attached at a position diametrically opposed to the first vibration sensor and at height H2, as shown in FIG. 3B, and where each vibration sensor is configured to output voltage signals representing sensed vibrations. In this option, a summer 344 is configured to receive and add the output voltage signals representing sensed vibrations.

The signal generator 332 is configured to provide actuation current to the first 342 and second 344 vibration inducers, and the first and second vibration inducers are configured to vibrate synchronously the outer surface of the cylindrical object 302 upon receiving the actuation current.

The signal generator is configured to sweep the actuation current over a frequency range of 10 to 15 kHz. The vibration sensors are accelerometers configured to receive vibrations in the frequency range of 1 to 2000 Hz.

The program instructions include a Fast Fourier transform (see FFT module 768, FIG. 7), and the processor 776 is configured to translate the digitized signals with the Fast Fourier transform.

The computer is configured to compare the ovaling mode frequency and amplitude to a reference ovaling mode frequency of a reference cylindrical object of diameter equal to D.

The structural integrity report is based on the difference between the reference ovaling mode and amplitude and the ovaling mode and amplitude from the frequency response analysis respectively.

The second embodiment is described with respect to FIG. 3A, 3B and FIG. 7. The second embodiment describes a method for determining the structural integrity of a cylindrical object 302 of height H and diameter D, comprising installing two diametrically opposed vibration inducers (342, 344) on an outer perimeter of the cylindrical object at a height H1, installing two diametrically opposed vibration sensors (362, 364) around a perimeter of the cylindrical object at a height H2, each vibration sensor installed halfway between the two vibration inducers, wherein H1<H, H2<H and H1-H2 is in the range of 3 to 10 inches.

The method includes synchronously actuating, by a signal generator 332, the two vibration inducers at a time t=0, receiving, by the vibration sensors, vibrations induced in the cylindrical object by the vibration inducers, each vibration sensor generating voltage response signals, adding, with a summer 344, the voltage response signals, amplifying, with a signal amplifier 361, the voltage response signals, digitizing, with an A/D converter 366, the amplified voltage response signals, translating, by a computer 367 having at least one processor 776 including program instructions including a Fast Fourier transform 768, the digitized signals to the frequency domain, performing, by the computer, a frequency response analysis (see frequency response module 784) on the translated digitized voltage signals, determining the ovaling mode frequency and the amplitude of the ovaling mode based on the frequency response analysis, comparing the ovaling mode frequency and amplitude to a reference ovaling mode frequency and amplitude, and outputting a structural integrity report of the cylindrical object on a display.

The frequency response analysis further includes comparing the phases of the voltage signals.

The method continues by comparing the ovaling mode frequency and amplitude to a reference ovaling mode frequency of a reference cylindrical object of diameter equal to D and comparing the ovaling mode frequency and amplitude to a chart comprising, for a cylindrical object diameter equal to D and material composition equal to that of the test cylindrical object, ovaling mode frequencies and ovaling mode amplitudes for flawless cylindrical objects.

The method further comprises comparing, by the computer, the ovaling mode frequency and amplitude to a database 780 record comprising, for a cylindrical object diameter equal to D and material composition equal to that of the test cylindrical object, ovaling mode frequencies and ovaling mode amplitudes for flawless cylindrical objects.

The method continues by determining, by the computer, the stiffness of the cylindrical object under test by the comparing the ovaling mode frequency to a reference ovaling mode frequency, determining the strength of the cylindrical object under test by the comparing the amplitude of the ovaling mode to the amplitude of a reference ovaling mode, including the stiffness and the strength in the structural integrity report (see structural integrity reporting module 794), and displaying the structural integrity report on a computer display 792.

The method includes an option for storing, on a recorder 365, the voltage signals and the relative phases of the voltage signals, outputting the recorded voltage signals and phases to the signal amplifier at a later time.

The method includes generating, by the computer, a model of the cylindrical object based on the frequency response analysis, and comparing the computer model to a reference database record of ovaling mode frequencies and ovaling mode amplitudes for flawless cylindrical objects of diameter equal to D and material composition equal to that of the test cylindrical object.

The third embodiment is described with respect to FIG. 3A, 3B and FIG. 7. The third embodiment describes a system for determining the stiffness and structural integrity of a cylindrical object 302, comprising generating, by two diametrically opposed vibration inducers (342, 344) placed at the same height on the surface of the cylindrical object, synchronous vibrations in the cylindrical object, receiving vibrations, by two diametrically opposed vibration sensors (362, 364), each placed halfway between the two vibration inducers, and generating voltage signals representative of the vibrations, adding the voltage signals, by a summer 344, and recording their relative phase differences (see vibration response signals 364), processing, by a computer including circuitry and at least one processor 776 having program instructions, the voltage signals to determine the ovaling mode frequency and the amplitude of the ovaling mode, generating a computer model of the cylindrical object, comparing the computer model to a reference database 780, outputting, on a display, a structural integrity report 794 and stiffness of the cylindrical object. The processing further comprises amplifying, with a signal amplifier 761, the voltage signals, digitizing, with an A/D converter 766, the amplified voltage signals, translating, by program instructions including a Fast Fourier transform 768, the digitized signals to the frequency domain, performing, by the computer 767, a frequency response analysis (see 784) on the translated digitized voltage signals, determining, by the computer, the stiffness of the cylindrical object under test by the comparing the ovaling mode frequency to a reference ovaling mode frequency, determining the strength of the cylindrical object under test by the comparing the amplitude of the ovaling mode to the amplitude of a reference ovaling mode, and including the stiffness and the strength in the structural integrity report 794.

Figure 4A:
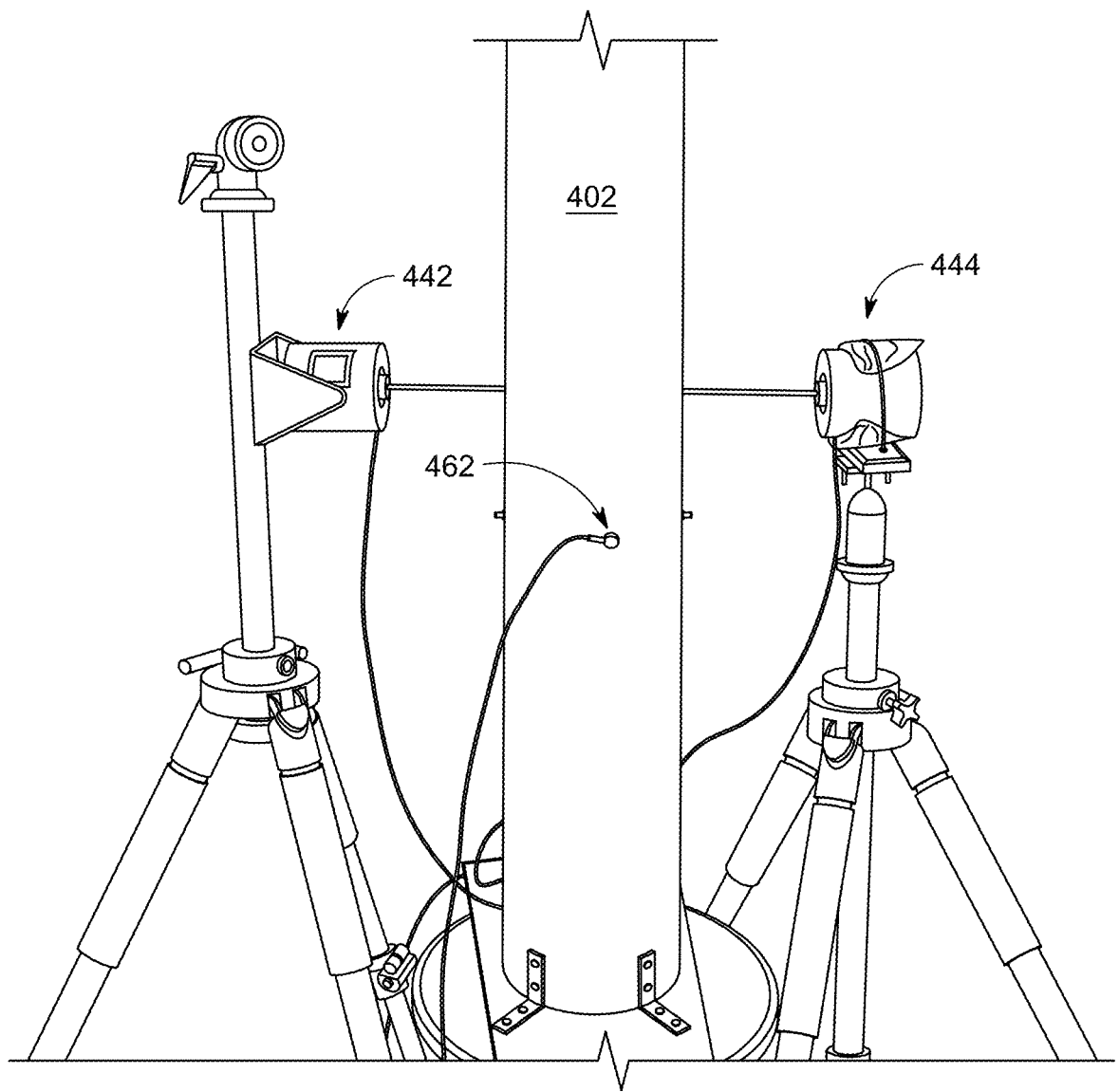
FIG. 4A depicts an experimental apparatus having one vibration sensor.

Experimental tests using a single vibration sensor were conducted on a circular hollow PVC pipe 402 with an external diameter of 168 mm and a thickness of 5.0 mm as shown in FIG. 4A. Two identical electro-dynamic vibration inducers were used as sources of vibrations for exciting the specimen under investigation. In a non-limiting example, the vibration inducers may be of the exciter type 5961 manufactured by Bruel & Kjaer. (See "Hand-held Exciter-Type 5961", Bruel & Kjaer North America Inc. (HQ), 3079 Premiere Parkway, Suite 120, Duluth, Ga. 30097, U.S.A.). For each of the vibration inducers, 442 and 444, one of the ends of a few inches long rod (sometimes also called "stinger") was firmly screwed to the vibrating base of the vibration inducer while the other end was attached with nuts to the cylindrical pipe. The vibration inducers were attached on the same cross-sectional plane normal to the pipe axis at diametrically opposed positions such that the motion of their shafts was oriented radially. In this way the in phase signals generated by the vibration inducers compress or stretch the pipe in the radial direction simultaneously. The measuring sensor 462, a Brüel & Kjaer piezo-electric accelerometer of type 4371, was attached to the pipe at exactly mid-way and below between the vibration inducers as shown in FIG. 4A.

Figure 5A:
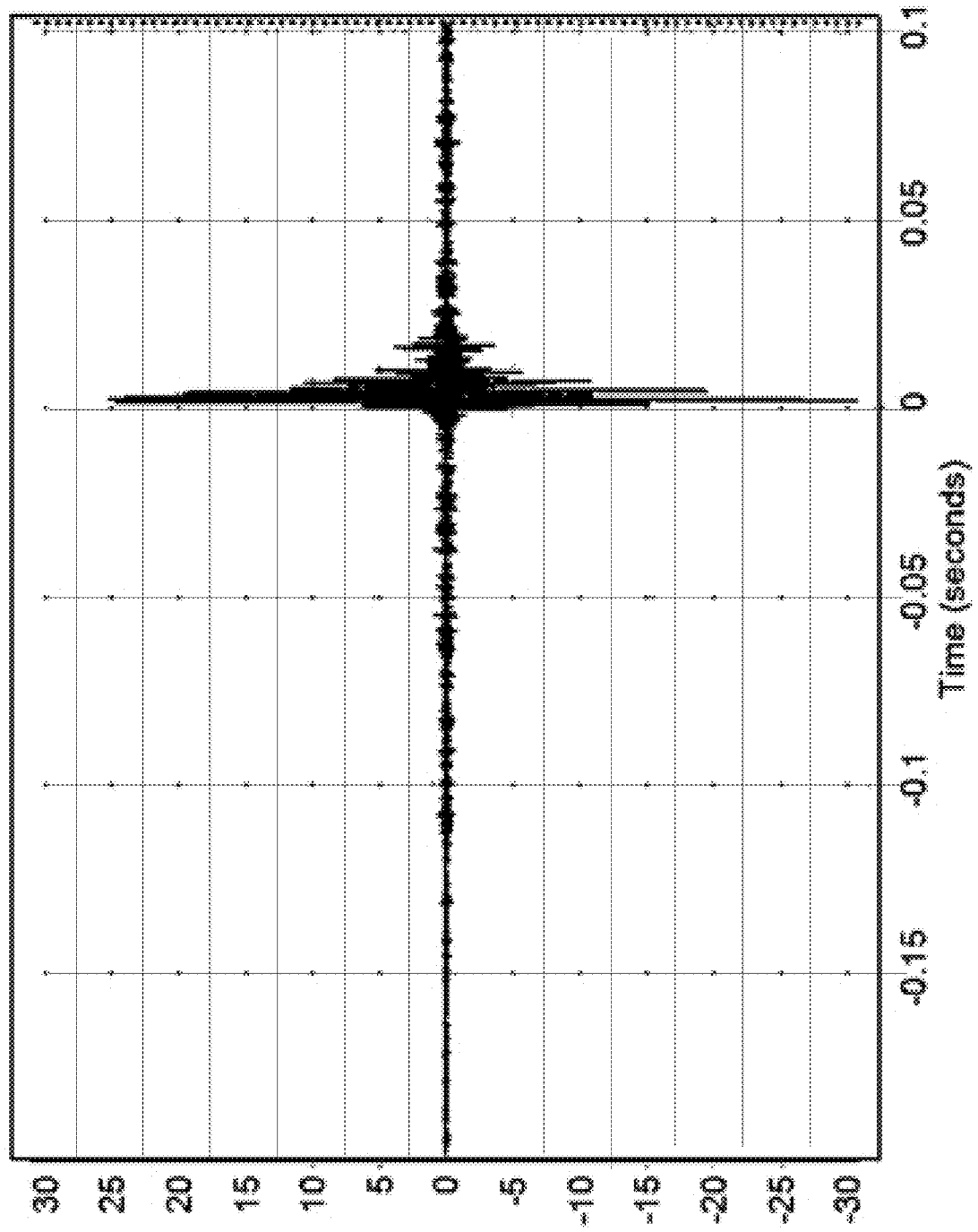
FIG. 5A-5B show a plots of the impulse response resulting from a measurement on a PVC pipe for (A) one vibration sensor and (B) two vibration sensors.

The excitation signal used for the measurements was a sinusoidal sweep with gradually increasing frequency in the frequency range of 10 Hz-15 KHz. The impulse response was acquired through an automatic procedure inbuilt in the ODEON room acoustical simulation software, version Odeon Combined 14, was also incorporated a measurement function in this regard. (See Odeon 14 Features, Odeon A/S, DTU Science Park, Diplomvej Bldg. 381, DK-2800 Kgs. Lyngby Denmark https://odeon.dk/whats-new-version-14/, incorporated herein by reference in its entirety). Hence the impulse response is processed through performing a cross-correlation operation between the response of the test specimen and the excitation signal causing this response. FIG. 5A shows a plot of the impulse response resulting from a measurement on the PVC pipe, which is identified as the vibration response signal 364 of FIG. 3A.

Figure 6A:
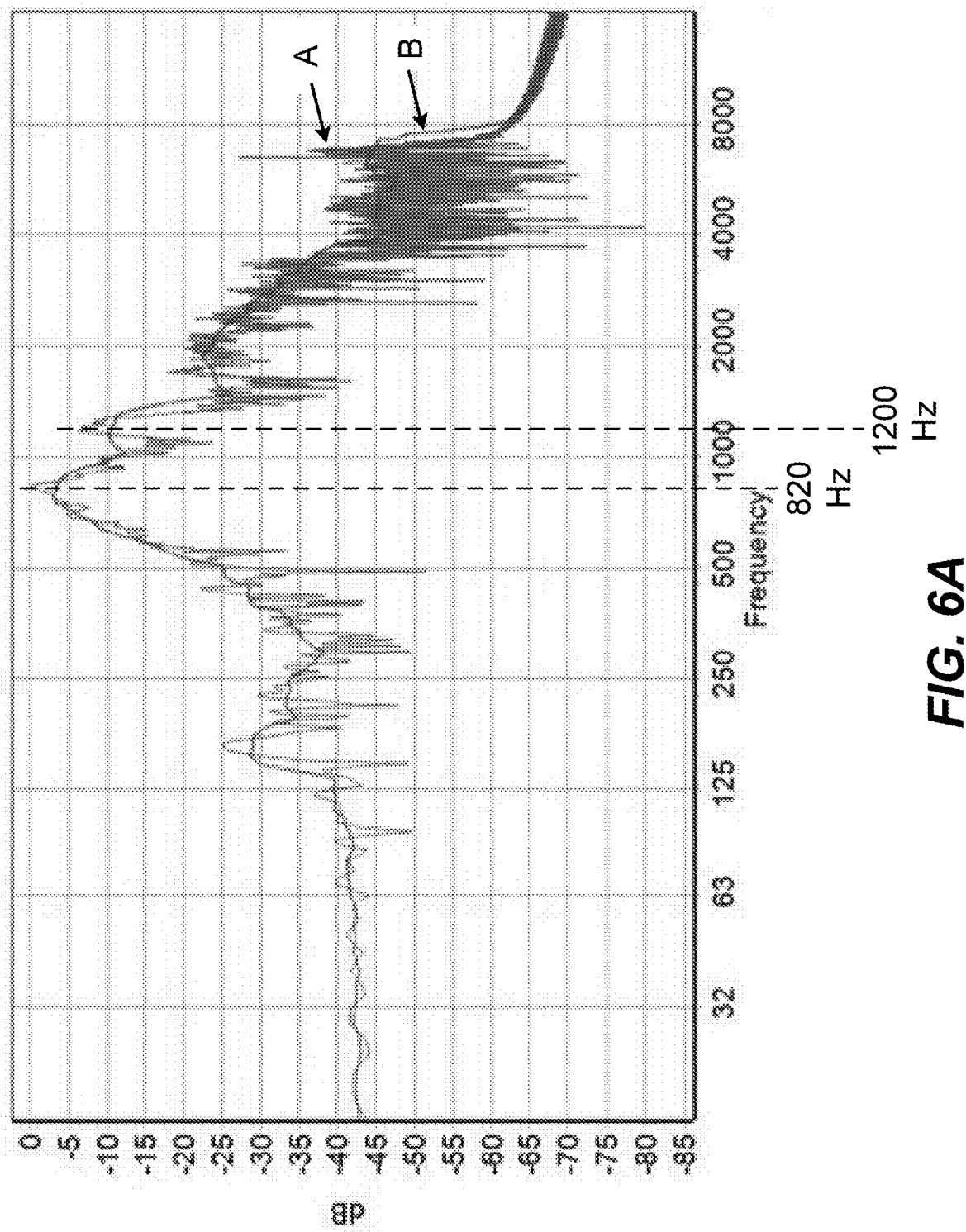
FIG. 6A shows a plot of the amplitude of the transfer function calculated from the impulse response in FIG. 5A.

In the frequency domain, the transfer function, resulting from performing a Fourier transform on the impulse response was accomplished through the Fast Fourier Transform, FFT, algorithm. FIG. 6A shows a plot of the amplitude of the transfer function calculated from the impulse response in FIG. 5A. The amplitude is shown on the Y-axis in logarithmic scale, in dB, normalized to the maximum value of the amplitude.

The curves in these plots are presented in both complete, (blue, noisy trace A), and smoothed (red, solid line B). The plots show a clear peak at 820 Hz, and which corresponds to the resonance frequency of the ovaling mode. Another peak at around 1200 Hz is that of the next even extensional mode. For a very thin cylindrical shell, the ovaling mode exhibits its presence for an excitation at a frequency such that the circumference of the shell corresponds to approximately two bending wavelengths while for the next even cross-sectional mode the circumference corresponds to four wavelengths, i.e. at a frequency double of that of ovaling mode. This relationship however becomes more complicated in the case of bending waves and for a thick cylinder.

Figure 4B:
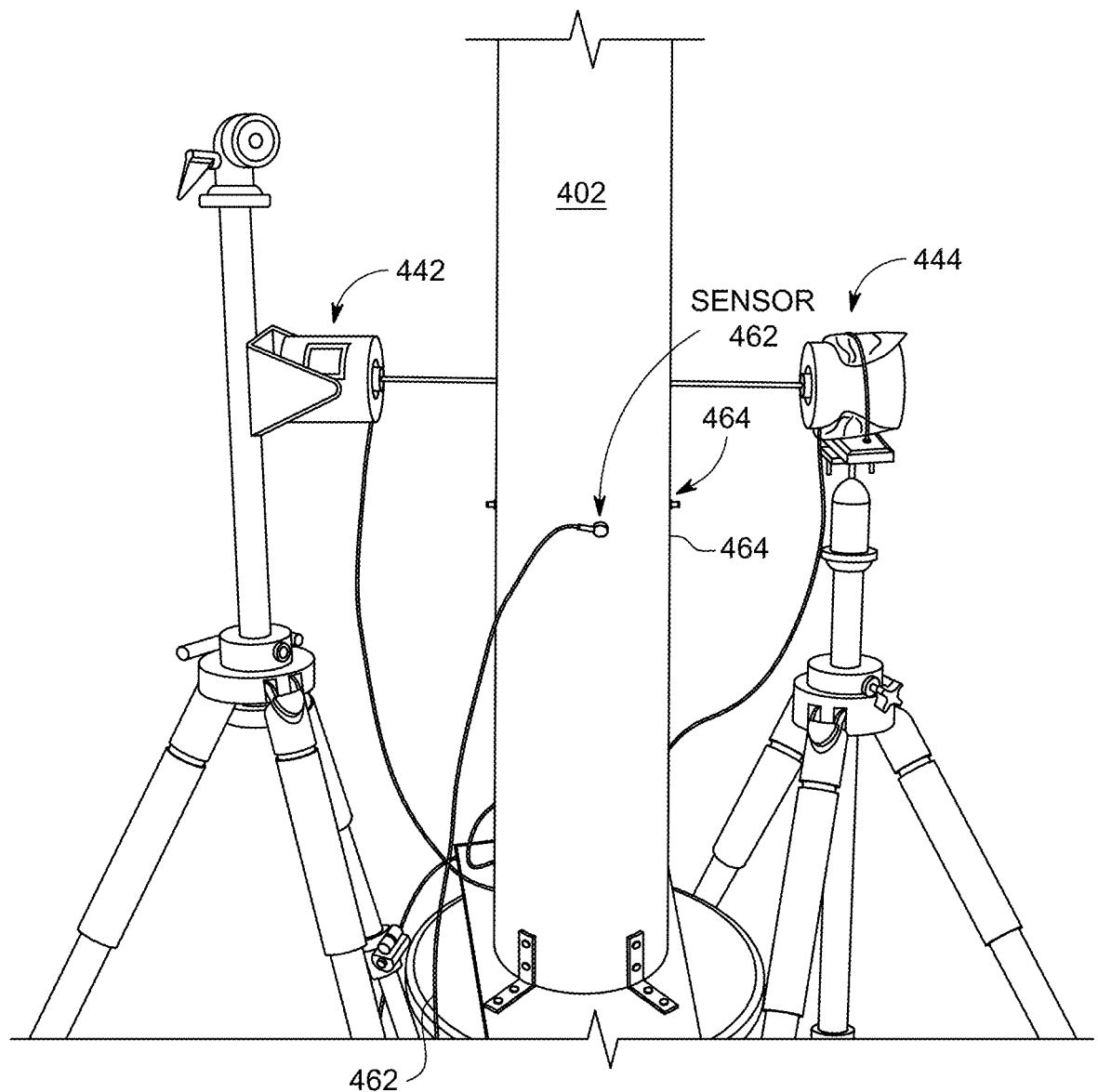
FIG. 4B depicts an experimental apparatus having two vibration sensors.

A measuring test using two vibration measuring sensors was conducted as shown in FIG. 4B, which is a photograph of the experimental set-up used for the extraction of the ovaling mode on a PVC cylindrical hollow pipe. A pair of Brüel & Kjaer piezoelectric accelerometers of type 4371 were attached to the pipe at a distance mid-way distance between the positions of the vibration inducer positions as shown in FIG. 4B. FIG. 4B shows only vibration sensor 462, as vibration sensor 464 is on the back side of the cylinder 402.

As described above for the single sensor test and for comparison purposes, the excitation signal used for the measurements was a sinusoidal sweep with gradually increasing frequency in the frequency range of 10 Hz-15 KHz. The impulse response was acquired through an automatic procedure inbuilt in the ODEON room acoustical simulation software, version Odeon Combined 14, was also incorporated a measurement function in this regard. Hence the impulse response is processed through performing a cross-correlation operation between the response of the test specimen and the excitation signal causing this response.

Figure 5B:
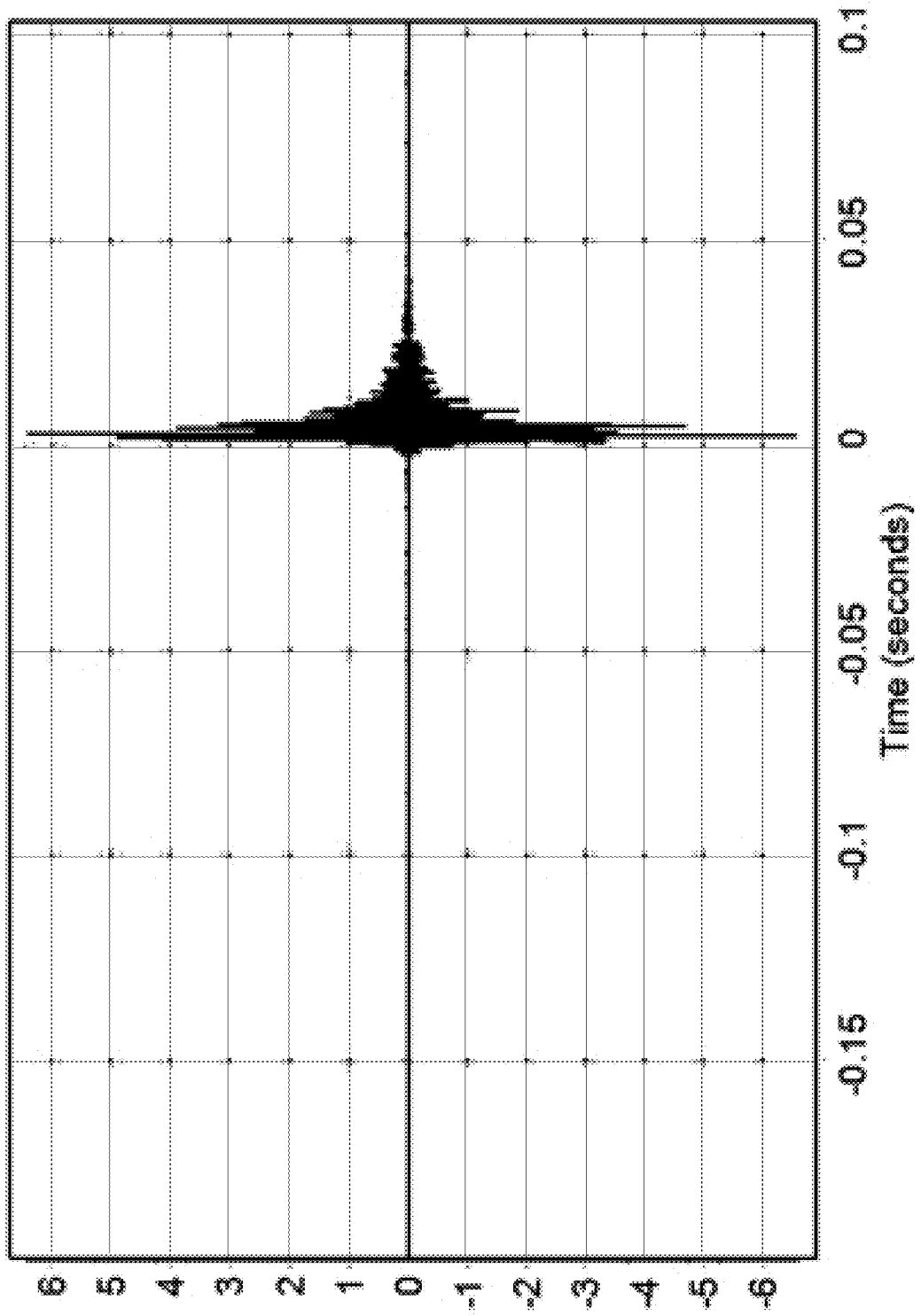

FIG. 5B is a plot of the summed impulse response recorded by the vibration sensors as resulting from exciting the PVC pipe by two identical vibration inducers 442 and 444 attached to the pipe at two diametrical opposed positions and acting in radial direction. The y-axis shows the amplitude on a linear scale, arbitrary units. As can be seen from the plot, the response signals start a short time after from t=0, with the first harmonic showing at approximately t=0.005 seconds. The second harmonic, the ovaling mode, shows at about t=0.01 seconds with an amplitude of about 4. This plot does not show the ovaling mode clearly enough to calculate the ovaling frequency.

Figure 6B:
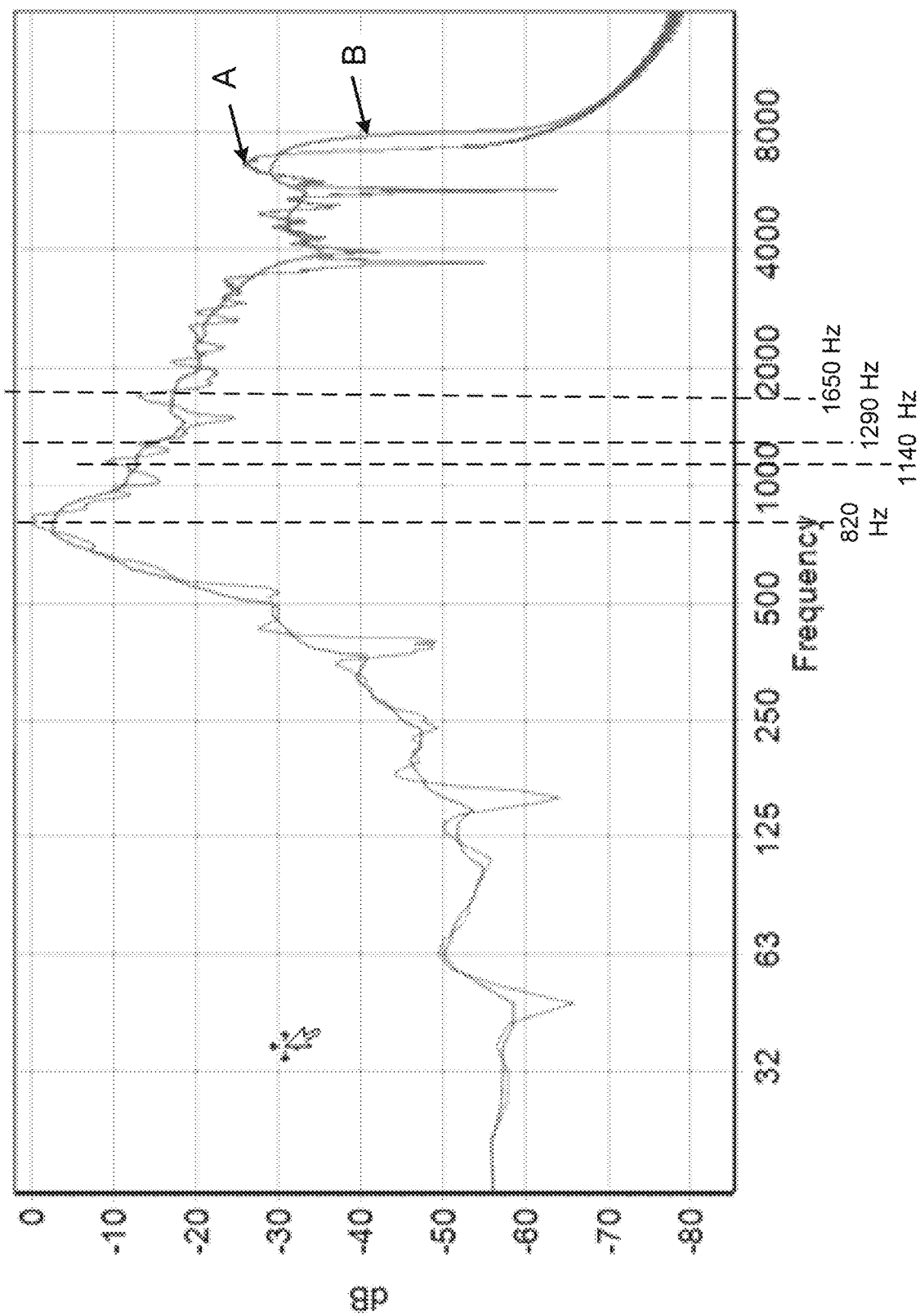
FIG. 6B shows a plot of the amplitude of the transfer function calculated from the impulse response in FIG. 5B.

The summed impulse response is digitized in an A/D converter and applied to a Fast Fourier Transform algorithm, FFT, to translate the signal to the frequency domain. FIG. 6B shows a plot of the amplitude of the transfer function calculated from the impulse response in FIG. 5B. The amplitude is shown on the Y-axis in logarithmic scale, in dB, normalized to the maximum value of the amplitude.

The curves in these plots are presented in both complete, (blue), and smoothed (red). The plots show a clear peak at around 820 Hz, and which corresponds to the resonance frequency of the ovaling mode. A few other peaks of minor amplitudes also show at higher frequencies, 1140 Hz, 1290 Hz and 1650 Hz, and some of which probably also are of the cross-sectional type, whereas others may be reminiscent from other mode types. However, the ovaling mode exhibits its peak clearly, and exceeds the level of other peaks by more than 10 dB. The plot of FIG. 6B exhibits that the ovaling mode is much more clearly defined when two, diametrically opposite vibration sensors are used. In case of a very thin cylindrical shell, the ovaling mode would exhibit its presence for an excitation at a frequency such that the circumference of the shell corresponds to approximately two bending wavelengths while for the next even cross-sectional mode the circumference corresponds to four wavelengths, i.e. at a frequency double of that of ovaling mode. This relationship however becomes more complicated in the case of bending waves and for a thick cylinder.

A testing apparatus and method for non-destructive testing of elements of solid materials using mechanical vibrations is described. The apparatus does not use ultrasonic signals with the accompanying problems of attaching probes, nor does it use dangerous penetrating radiation that requires specialized cumbersome, heavy, sensitive, and costly equipment for generating hazardous rays. The testing method is based on principles that do not require either deep knowledge or special training from the operator, and uses equipment that is affordable and that is light in weight so that it can be borne by the operator for on-site testing. The measurement depends only on the cross-sectional size of the inspected element, which is easily obtained with a tape measure, and not on its axial extent.

The testing apparatus and method for testing may be applied to inspecting weight bearing elements of cylindrical shape that are used in construction or as parts of larger building structures, such as columns, pillars in harbor piers or for supporting bridges. In the wood industry, the test may be used for sorting logs according to their strength quality prior to cutting into lumber, identifying trees most likely to yield good quality lumber or those that are infected with insects or disease, with a goal towards treating or isolating the damaged tree. For wooden poles, such as those which bear telephone or electrical cables, the test may be applied to identify those poles which need replacement.

The experimental testing of the present disclosure proves that is usable for in-situ testing and field measurements. A testing product may include a pair of identical hammer-like tools that each generate a stress wave in the cylinder and which are steered to operate simultaneously, which is achieved through a latching system for triggering the motion of the two hammers simultaneously. Depending on the strength of the material and the size of the cylindrical element, the contact surfaces of the hammer tips and the points of application of the blow are preferably tailored to the test object. Thus, cylinders of larger diameter and/or softer materials may use softer contacts than thinner and/or harder materials.

The present disclosure includes a method of determining the condition of a cylindrical element of solid material, either filled or hollow, such as a log, a tree trunk or a wooden pole, or any cylindrical element of solid material such as a pillar of concrete or steel, and comprises:

(a) initiating the natural vibrations of the cylindrical wooden element in a frequency range that covers the lowest three natural modes of vibration of extensional kind;

(b) the excitation of the test cylindrical element is accomplished through the simultaneous action of two synchronous phase-matched vibration exciters;

(c) recording the cylinder's response by means of a transducer generating an electrical voltage equivalent to the vibration motion of the extensional modes of the cylindrical element;

(d) converting the voltage electrical response to a digital signal;

(e) executing a digital Fourier Transform, Fast Fourier Transform, or FFT, on the digital signal for acquiring the transfer function, or frequency response, of the element;

(f) determining the frequency of the second natural extensional mode of vibration, the "ovaling mode" of the cylindrical element from the digital signal;

(g) from charts established for the resonance frequencies of the ovaling mode in sound cylindrical wood elements comparison may be made between the value of the measured frequency and the ones on the chart according to the cross-sectional size of the cylindrical element. Here consideration has been made to green wood in standing trees or in trunks of freshly hewn trees;

(h) for wooden poles or cylindrical elements of solid materials other than wood (for instance of reinforced concrete that can be affected by corrosion or a material that can host manufacturing defects) other charts can be established;

(i) a reading of the resonance frequency of the ovaling mode permits to evaluate the stiffness of the cylindrical wood element and assess its soundness status;

The phase of the voltage electrical response equivalent to the vibration motion of the surface of the body at the site of a test for subsequent analysis and interpretation is recorded.

The test specimen may be a cylindrical log, a wooden pole, the trunk of a standing tree, or any other cylindrically shaped object of a solid or hollow material.

The natural cross-sectional vibration is initiated by a pair of synchronous electro-dynamic transducers, such a transducer being a vibration inducer (or vibrator), and which are strongly fastened to the cylinder under test at two diametrically opposed positions on the same circumference normal to the axis of the cylinder.

The analog electrical voltage response is generated by an accelerometer rigidly attached to the cylindrical wooden element through a spike attached to the base of the accelerometer.

The analog signal is amplified by a signal amplifier embodied in an A/D converter.

The analog amplified signal is digitized and the obtained digital signal is analyzed by a software installed on a computer.

The natural cross-sectional vibrations, extensional, vibrations of the cylindrical wooden element are initiated in the frequency range from 0 to 2000 Hz.

Determining the stiffness of a cylindrical element is described comprising:
- (a) initiating the natural vibration of the body in a frequency band that covers at least two of the first extensional resonant modes of vibration;
- (b) generating an electrical response equivalent to the surface vibration motion of the body;
- (c) determining the frequency of the ovaling mode of vibration according to the cross-sectional size of the cylindrical element and the solid material it is made of;
- (d) formulating a mathematical model of the element, from which the natural frequencies of the ovaling mode of vibration model may be modelled and drawn on a graph expressing resonance frequency as function of cross-sectional size (average perimeter or diameter);
- (e) comparing the value of the measured resonance frequency of the ovaling mode on the cylindrical element and comparing it to the value read on the graph for the corresponding cross-sectional size of the sound cylindrical element and decide on the degree of soundness of the tested cylindrical element. Three main soundness regions, can be adopted, namely "green" when the strength of the tested element is above 75% of the reference sound cylinder of corresponding size, "orange" if the value is below 75% but above 50%, and "red" if it is less than 50%. For wood elements the strength of the element is depending on the degree of its affection by rot, for steel it may be rust, and for concrete it may be corrosion, but may be due to the presence of strength-weakening defects (knots and cross-grain for wood, or voids, delamination and external agents in concrete and steel), poor processing of the material or due to a defective operation during its manufacturing (casting, filling, tempering, cooling) These defects may be estimated from the change in the value of the frequency of the ovaling mode. The present disclosure further includes a method that comprises determining the strength condition of a cylindrical element of solid material, filled or hollow, such as a pillar of concrete or of steel, a wooden pole, or any cylindrically shaped element of solid material like a log or a tree trunk, and comprising:
- (a) initiating the natural vibrations of the cylindrical element in a frequency range that covers the lowest few natural modes of vibration of the cross-sectional kind;
- (b) where the excitation of the test cylindrical element is accomplished through the simultaneous action of two identical synchronous phase-matched vibration exciters;
- c) recording of the cylinder's response by means of a pair of identical phase-matched vibration sensors generating each an electrical voltage corresponding to the vibration amplitude of the cross-sectional modes of the cylindrical element. The vibrations sensors are attached at two diametrically opposed positions on the surface of the cylindrical element at 90° from the point of application of the excitation forces. The in-phase signals from the vibration sensors are then added to give a signal-sum for enhancing the response of even cross-sectional modes, the lowest in the series of which being the ovaling one.
- (d) converting the electrical voltage of the response signal-sum into a digital signal;
- (e) executing a digital Fourier Transform, Fast Fourier Transform, or FFT, on it for acquiring the Transfer Function, or frequency response, of the element;
- (f) determining the frequency of the ovaling mode of the cylindrical element from the digital signal;
- (g) from reference charts established for the resonance frequencies of the ovaling mode in sound cylindrical elements made of the same material as function of cross-sectional size, comparison may be made between the value of the measured frequency and the corresponding one on the reference chart with reference to the cross-sectional size (diameter or perimeter) of the cylindrical element. For wood elements consideration is made to green wood in standing trees or in trunks of freshly hewn trees and variations for wood species as well environmental growing and soil conditions are taken into consideration;
- (h) for (cured) wooden poles or cylindrical elements of solid materials other than wood (for instance metallic pillars or pillars made of reinforced concrete that can be affected by corrosion or a material that can host manufacturing defects) obviously other charts can be established;
- (i) a reading of the resonance frequency of the ovaling mode permits to evaluate the stiffness of the cylindrical element and assess its soundness status;

The phase of the voltage electrical response equivalent to the vibration motion of the surface of the body at the site of a test for subsequent analysis and interpretation is recorded.

The test specimen may be a cylindrical shape, filled or hollow, e.g. a log, a metallic or concrete column, a wooden pole, the trunk of a standing tree, or any other cylindrically shaped object of a solid material.

The analog electrical voltage response is generated by an accelerometer rigidly attached to the cylindrical wooden element through a spike attached to the base of the accelerometer. An alternative means for excitation is the use of identical synchronous hammers for imparting two short stress pulses radially directed on the surface of the cylinder.

Two identical vibration sensors, such as accelerometers, are rigidly fastened at two diametrically opposed positions on the cylindrical element. For a wooden cylinder (log, pole, or tree trunk), the accelerometers may be attached through a spike attached to their base. The response of the accelerometers consists of converting the generated vibrations on the surface of the cylinder to analogue electrical voltage. The responses of the accelerometers in the form of electrical voltages are then summed through the use of an electronic signal adder composed of simple electronic and electric components and which results in a response signal-sum.

The analog signal is amplified by a signal amplifier embodied in an A/D converter.

The analog amplified signal is digitized and the obtained digital signal is analyzed by a software installed on a computer.

The natural cross-sectional vibrations, extensional, vibrations of the cylindrical wooden element are initiated in the frequency range from 0 to 2000 Hz.

Determining the stiffness of a cylindrical element comprises:

(a) initiating the natural vibration of the body in a frequency band that covers at least two of the first even cross-sectional resonant modes of vibration;

(b) generating an electrical response equivalent to the surface vibration motion of the body at two diametrically opposed positions on the inspected cylinder and then summing up those two response signals;

(c) determining the frequency of the ovaling mode of vibration according to the cross-sectional size of the cylindrical element and the solid material it is made of;

(d) formulating a mathematical model of the element, from which the natural frequencies of the ovaling mode of vibration model may be modelled and drawn on a reference graph expressing resonance frequency as function of cross-sectional size (average perimeter or diameter);

(e) comparing the value of the measured resonance frequency of the ovaling mode on the cylindrical element and comparing it to the value read on the reference graph for the corresponding cross-sectional size of the sound cylindrical element and decide on the degree of soundness of the tested cylindrical element. Here one can adopt 3 main soundness regions, namely "green" when the strength of the tested element is above 75% of the reference sound cylinder of corresponding size, "orange" if the value is below 75% but above 50%, and "red" if it is less than 50%. For wood elements the strength of the element depends on the degree of its affection by rot, for steel it may be rust, and for concrete it may be corrosion. Moreover the change of material strength is not due only to the change of the material properties at the microscopic level, but may be due to the presence of strength-weakening defects (knots and cross-grain for wood, or voids, delamination and external agents in concrete and steel), poor processing of the material or due to a defective operation during its manufacturing (casting, filling, tempering, cooling) These defects may be estimated from the change in the value of the frequency of the ovaling mode.

Next, further details of the hardware description of the computing environment of FIG. 7 according to exemplary embodiments is described with reference to FIG. 8. In FIG. 8, a controller 800 is described which is representative of the system 700 of FIG. 7 in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 801, 803 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
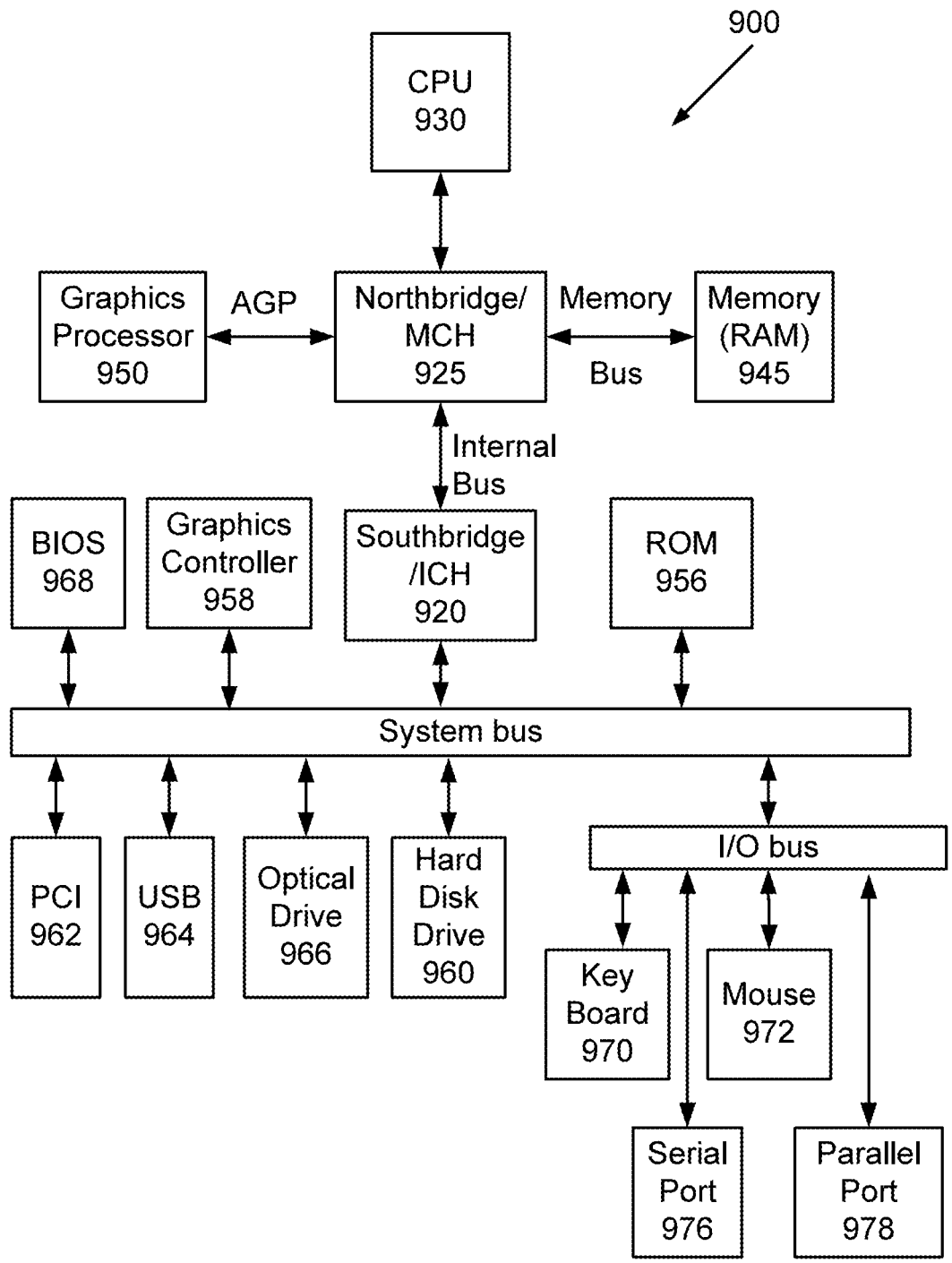
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
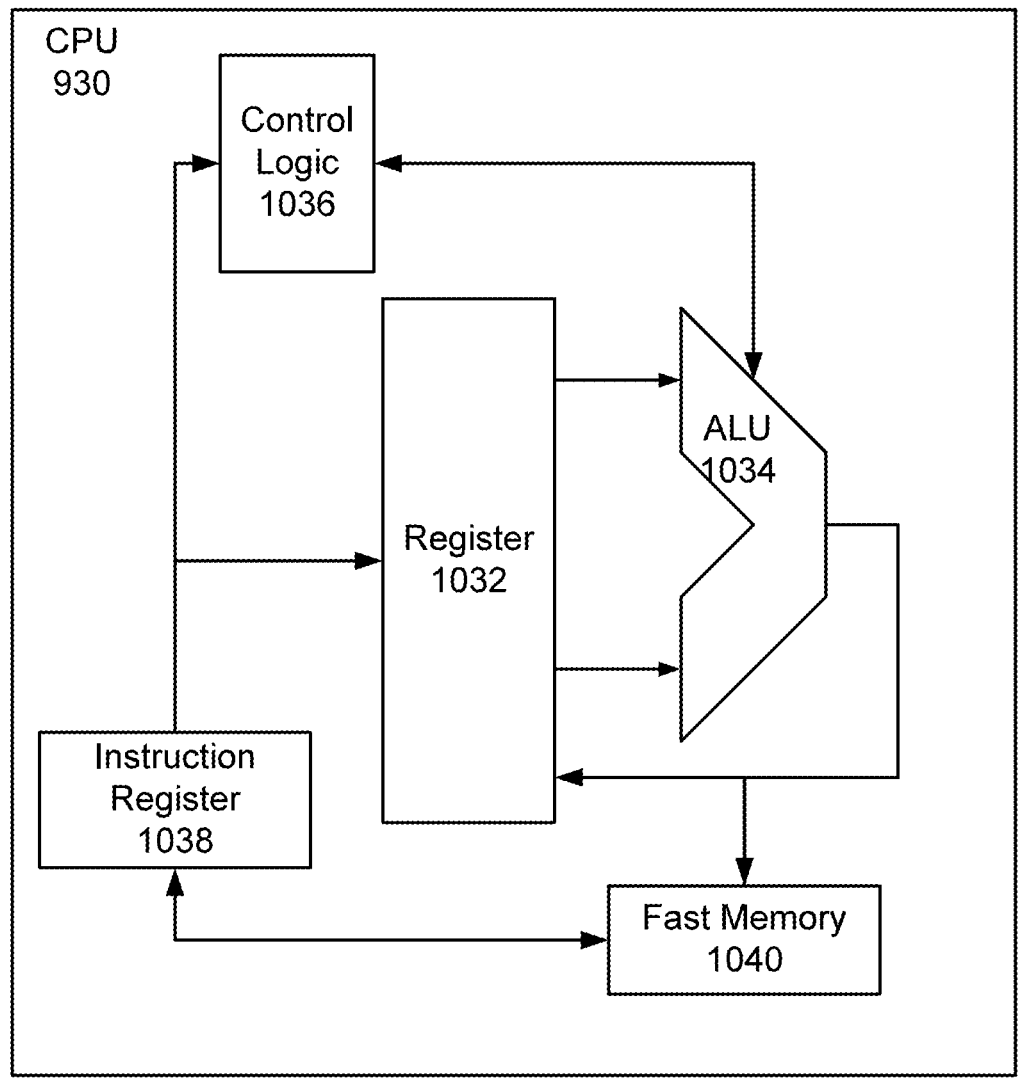
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 830. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
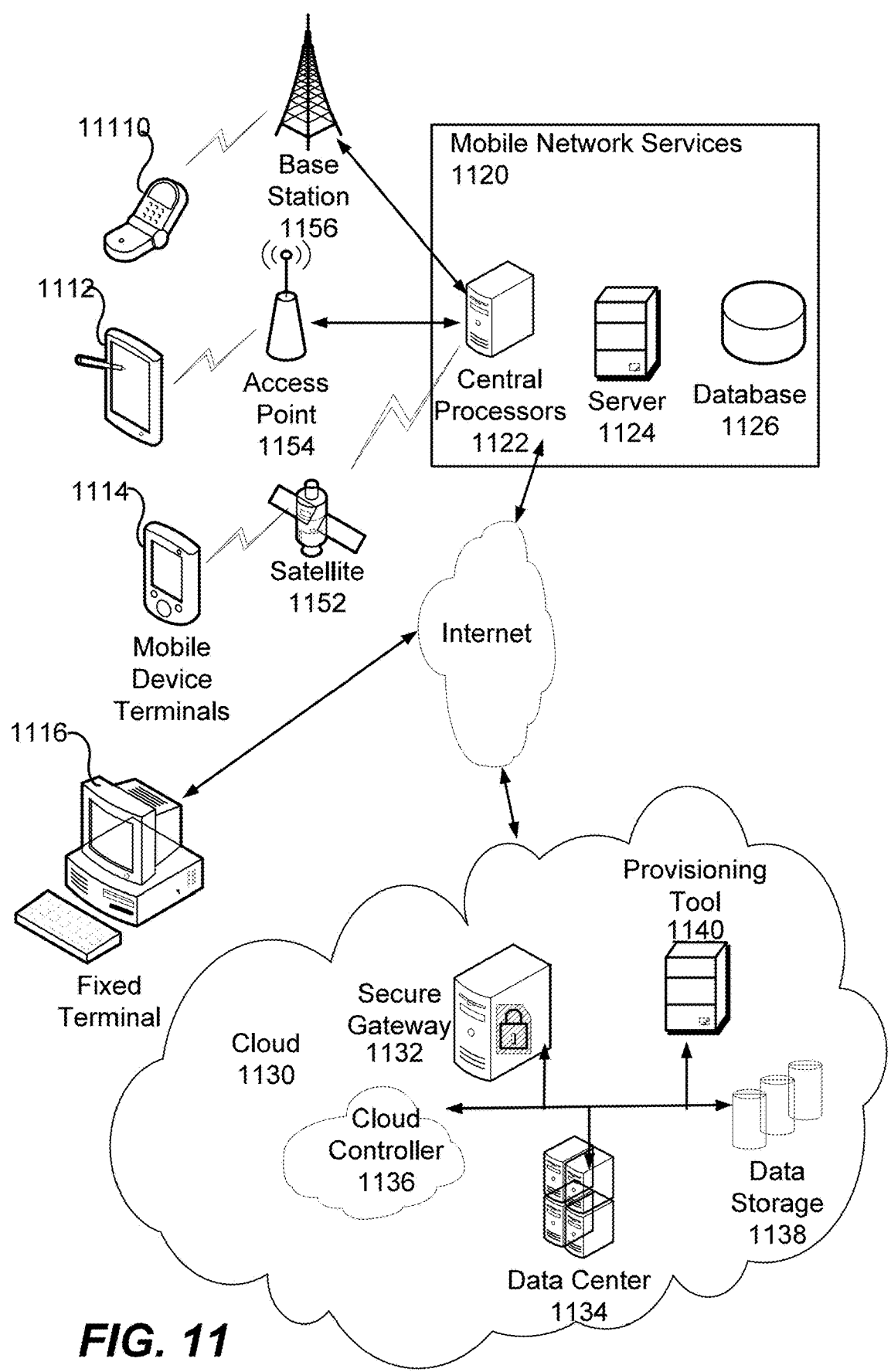
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A testing apparatus for determining the structural integrity of a cylindrical object, the cylindrical object having an outer surface, a height, H, and a diameter, D, comprising:
   first and second vibration inducers, each attached to the outer surface of the cylindrical object at diametrically opposite positions at the same height H1;
   a signal generator electrically connected to the first and second vibration inducers;
   at least one vibration sensor attached at a position on the outer surface halfway between the vibration inducers and at a height H2, the vibration sensor configured to output voltage signals representing sensed vibrations;
   a signal amplifier configured to amplify the voltage signals;
   an A/D converter configured to digitize the voltage signals;
   a computer having circuitry and at least one processor including program instructions configured to:
      translate the digitized voltage signals to the frequency domain;
      perform a frequency response analysis on the translated digitized voltage signals to determine the ovaling mode frequency and the amplitude of the ovaling mode;
      compare the ovaling mode frequency and amplitude to a reference ovaling mode frequency and amplitude;
      determine the structural integrity of the cylindrical object; and
      output a structural integrity report of the cylindrical object.

2. The testing apparatus of claim 1,
   wherein H1<H, H2 is less than H, and H1 is not equal to H2; and
   wherein H1-H2 is in the range of 3 to 10 inches.

3. The testing apparatus of claim 1,
   wherein the structural integrity report is output on any one of a computer monitor, a touch screen, a numerical display, a set of colored lights, a printer and a speaker.

4. The testing apparatus of claim 1,
wherein the at least one vibration sensor comprises a first vibration sensor and a second vibration sensor, wherein the second vibration sensor is attached at a position diametrically opposed to the first vibration sensor and at height H2, each vibration sensor configured to output voltage signals representing sensed vibrations.

5. The testing apparatus of claim 4, further comprising a summer configured to receive and add the output voltage signals representing sensed vibrations.

6. The testing apparatus of claim 1,
wherein the signal generator is configured to provide actuation current to the first and second vibration inducers; and
wherein the first and second vibration inducers are configured to vibrate synchronously the outer surface of the cylindrical object upon receiving the actuation current.

7. The testing apparatus of claim 6,
wherein the signal generator is configured to sweep the actuation current over a frequency range of 10 to 15 kHz; and
wherein the vibration sensors are accelerometers configured to receive vibrations in the frequency range of 1 to 2000 Hz.

8. The testing apparatus of claim 1, further comprising:
wherein the program instructions include a Fast Fourier transform; and
wherein the processor is configured to translate the digitized signals with the Fast Fourier transform.

9. The testing apparatus of claim 1,
wherein the computer is configured to compare the ovaling mode frequency and amplitude to a reference ovaling mode frequency of a reference cylindrical object of diameter equal to D.

10. The testing apparatus of claim 9,
wherein the structural integrity of the cylinder is determined by comparing the ovaling mode and amplitude from the frequency response with a reference ovaling mode and amplitude.

11. A method for determining the structural integrity of a cylindrical object of height H and diameter D, comprising:
attaching two diametrically opposed vibration inducers on an outer perimeter of the cylindrical object at a height H1;
installing two diametrically opposed vibration sensors around a perimeter of the cylindrical object at a height H2, each vibration sensor installed halfway between the two vibration inducers, wherein H1<H, H2<H and H1-H2 is in the range of 3 to 10 inches;
synchronously actuating, by a signal generator, the two vibration inducers at a time t=0;
receiving, by the vibration sensors, vibrations induced in the cylindrical object by the vibration inducers, each vibration sensor generating voltage response signals;
adding, with a summer, the voltage response signals;
amplifying, with a signal amplifier, the voltage response signals;
digitizing, with an A/D converter, the amplified voltage response signals;
translating, by a computer having at least one processor including program instructions including a Fast Fourier transform, the digitized signals to the frequency domain;
performing, by the computer, a frequency response analysis on the translated digitized voltage signals;
determining the ovaling mode frequency and the amplitude of the ovaling mode based on the frequency response analysis;
comparing the ovaling mode frequency and amplitude to a reference ovaling mode frequency and amplitude;
determining the structural integrity of the cylindrical object; and
outputting a structural integrity report of the cylindrical object on a display.

12. The method of claim 11,
wherein the frequency response analysis further includes comparing the phases of the voltage signals.

13. The method of claim 11,
comparing, by the computer, the ovaling mode frequency and amplitude to a reference ovaling mode frequency of a reference cylindrical object of diameter equal to D.

14. The method of claim 11, further comprising:
comparing the ovaling mode frequency and amplitude to a chart comprising, for a cylindrical object diameter equal to D and material composition equal to that of the test cylindrical object, ovaling mode frequencies and ovaling mode amplitudes for flawless cylindrical objects.

15. The method of claim 11, further comprising:
comparing, by the computer, the ovaling mode frequency and amplitude to a database record comprising, for a cylindrical object diameter equal to D and material composition equal to that of the test cylindrical object, ovaling mode frequencies and ovaling mode amplitudes for flawless cylindrical objects.

16. The method of claim 11, further comprising:
determining, by the computer, the stiffness of the cylindrical object under test by the comparing the ovaling mode frequency to a reference ovaling mode frequency;
determining the strength of the cylindrical object under test by the comparing the amplitude of the ovaling mode to the amplitude of a reference ovaling mode;
including the stiffness and the strength in the health report; and
displaying the health report on a computer display.

17. The method of claim 11, further comprising:
storing, on a recorder, the voltage signals and the relative phases of the voltage signals;
outputting the recorded voltage signals and phases to the signal amplifier at a later time.

18. The method of claim 11, further comprising:
generating, by the computer, a model of the cylindrical object based on the frequency response analysis; and
comparing the computer model to a reference database record of ovaling mode frequencies and ovaling mode amplitudes for flawless cylindrical objects of diameter equal to D and material composition equal to that of the test cylindrical object.

19. A system for determining the stiffness and health of a cylindrical object, comprising:
generating, by two diametrically opposed vibration inducers placed at the same height on the surface of the cylindrical object, synchronous vibrations in the cylindrical object;
receiving vibrations, by two diametrically opposed vibration sensors, each placed halfway between the two vibration inducers, and generating voltage signals representative of the vibrations;
adding the voltage signals, by a summer, and recording their relative phase differences;

processing, by a computer including circuitry and at least one processor having program instructions, the voltage signals to determine the ovaling mode frequency and the amplitude of the ovaling mode;

generating a computer model of the cylindrical object;

comparing the computer model to a reference database;

determining the structural integrity and stiffness of the cylindrical object; and outputting, on a display, a structural integrity report of the cylindrical object.

20. The system of claim 19, wherein the processing further comprises:

amplifying, with a signal amplifier, the voltage signals;

digitizing, with an A/D converter, the amplified voltage signals;

translating, by program instructions including a Fast Fourier transform, the digitized signals to the frequency domain;

performing, by the computer, a frequency response analysis on the translated digitized voltage signals;

determining, by the computer, the stiffness of the cylindrical object under test by the comparing the ovaling mode frequency to a reference ovaling mode frequency;

determining the strength of the cylindrical object under test by the comparing the amplitude of the ovaling mode to the amplitude of a reference ovaling mode; and including the stiffness and the strength in the structural integrity report.

* * * * *